(12) United States Patent
Wu et al.

(10) Patent No.: US 10,354,433 B2
(45) Date of Patent: Jul. 16, 2019

(54) METHOD AND APPARATUS FOR GENERATING AN ABSTRACT TEXTURE FOR A BUILDING FACADE OR MODEL

(71) Applicant: HERE GLOBAL B.V., Eindhoven (NL)

(72) Inventors: Guangli Wu, San Mateo, CA (US); Jeffrey Adachi, El Cerrito, CA (US); Antonio Haro, Walnut Creek, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/646,897

(22) Filed: Jul. 11, 2017

(65) Prior Publication Data
US 2019/0019324 A1    Jan. 17, 2019

(51) Int. Cl.
*G06T 7/49* (2017.01)
*G06T 15/04* (2011.01)
*G06T 19/20* (2011.01)
*G06T 7/90* (2017.01)
*G06T 7/60* (2017.01)

(52) U.S. Cl.
CPC .............. *G06T 15/04* (2013.01); *G06T 7/49* (2017.01); *G06T 19/20* (2013.01); *G06T 7/60* (2013.01); *G06T 7/90* (2017.01); *G06T 2207/30184* (2013.01)

(58) Field of Classification Search
CPC  G06T 15/04; G06T 7/49; G06T 7/187; G06T 7/11; G06T 19/20; G06T 2219/004
See application file for complete search history.

(56) References Cited

U.S. PATENT DOCUMENTS

| | | |
|---|---|---|
| 6,201,546 B1 | 3/2001 | Bodor et al. |
| 8,224,098 B2 | 7/2012 | Adabala |
| 8,705,843 B2 | 4/2014 | Lieckfeldt |
| 8,970,579 B2 | 3/2015 | Muller et al. |
| 9,036,915 B2 | 5/2015 | Quan et al. |

(Continued)

FOREIGN PATENT DOCUMENTS

WO    2013174867 A1    11/2013

OTHER PUBLICATIONS

C. Berg, Alexander & Grabler, Floraine & Malik, Jitendra. (2007). Parsing Images of Architectural Scenes. 1-8. 10.1109/ICCV.2007.4409091.*

(Continued)

*Primary Examiner* — Antonio A Caschera
(74) *Attorney, Agent, or Firm* — Ditthavong & Steiner, P.C.

(57) ABSTRACT

An approach involves receiving pixel-level labeling data for an image depicting at least a portion of a building facade. The pixel-level labeling data labels each of a plurality of pixels of the image as either window pixels or non-window pixels. The approach further involves generating a window pattern based on window size data, window spacing data, or a combination thereof extracted from the pixel-level labeling data. The approach further involves computing a confidence score for the window pattern based on at least one observed value of at least one characteristic of the window pattern or a deviation of the observed value from at least one expected value, and generating an abstract texture based on the window pattern, the confidence score, and/or other probabilistic metrics.

20 Claims, 14 Drawing Sheets

(56) References Cited

U.S. PATENT DOCUMENTS 9,600,607 B2    3/2017    Loss
9,613,388 B2    4/2017    Loss
2015/0199455 A1    7/2015    Loss

OTHER PUBLICATIONS

Lee, Sung & Nevatia, Ram. (2004). Extraction and integration of window in a 3d building model from ground view images. 1063-6919/04 CVPR'2004.*

Mathias et al., "ATLAS: A Three-layered Approach to Facade Parsing", International Journal of Computer Vision, Oct. 22, 2015, 27 Pages.

Vracar et al., "Obtaining Structural Descriptions of Building Facades", Computer Science and Information Systems, vol. 13, No. 1, Oct. 27, 2015, pp. 23-43.

Korah et al., "Analysis of Building Textures for Reconstructing Partially Occluded Facades", European Conference on Computer Vision, Lecture Notes in Computer Science, vol. 5302, 2008, 14 Pages.

Alsisan et al., "Variation-factored Encoding of Facade Images", Eurographics, 2012, 4 Pages.

Despine et al., "Adaptive Texture Synthesis for Large Scale City Modeling", The International Archives of the Photogrammetry, Remote Sensing and Spatial Information Sciences, 3D Virtual Reconstruction and Visualization of Complex Architectures, vol. XL-5/W4, Feb. 25-27, 2015, pp. 155-162.

Becker, "Quality Dependent Reconstruction of Building Facades", Quality of Context, Lecture Notes in Computer Science, vol. 5786, 2009, 12 Pages.

Demir et al., "Proceduralization of Buildings at City Scale", 2nd International Conference on 3D Vision, vol. 1, Dec. 2014, 8 Pages.

Muller et al., "Procedural Modeling of Buildings", Proceedings of ACM SIGGRAPH 2006, vol. 25, No. 3, Jul. 2006, pp. 614-623.

Fan et al., "A Probabilistic Model for Exteriors of Residential Buildings", ACM Transactions on Graphics, vol. 35, No. 5, Article 155, Sep. 2016, 13 Pages.

Cohen et al., "Merging the Unmatchable: Stitching Visually Disconnected SFM Models", International Conference on Computer Vision, 2015, 9 Pages.

Cantzler, "Improving Architectural 3d Reconstruction by Constrained Modelling", 2003, retrieved on May 10, 2017 from https://www.era.lib.ed.ac.uk/bitstream/handle/1842/319/IP030017.pdf?sequence=1&isAllowed=y, 165 Pages.

Loya et al., "A Practical Approach to Image-Guided Building Facade Abstraction", Computer Graphics International, 2008, 8 Pages.

Tsai et al., "Texture Generation and Mapping Using Video Sequences for 3D Building Models", Innovations in 3D Geo Information Systems, 2006, pp. 429-438.

* cited by examiner

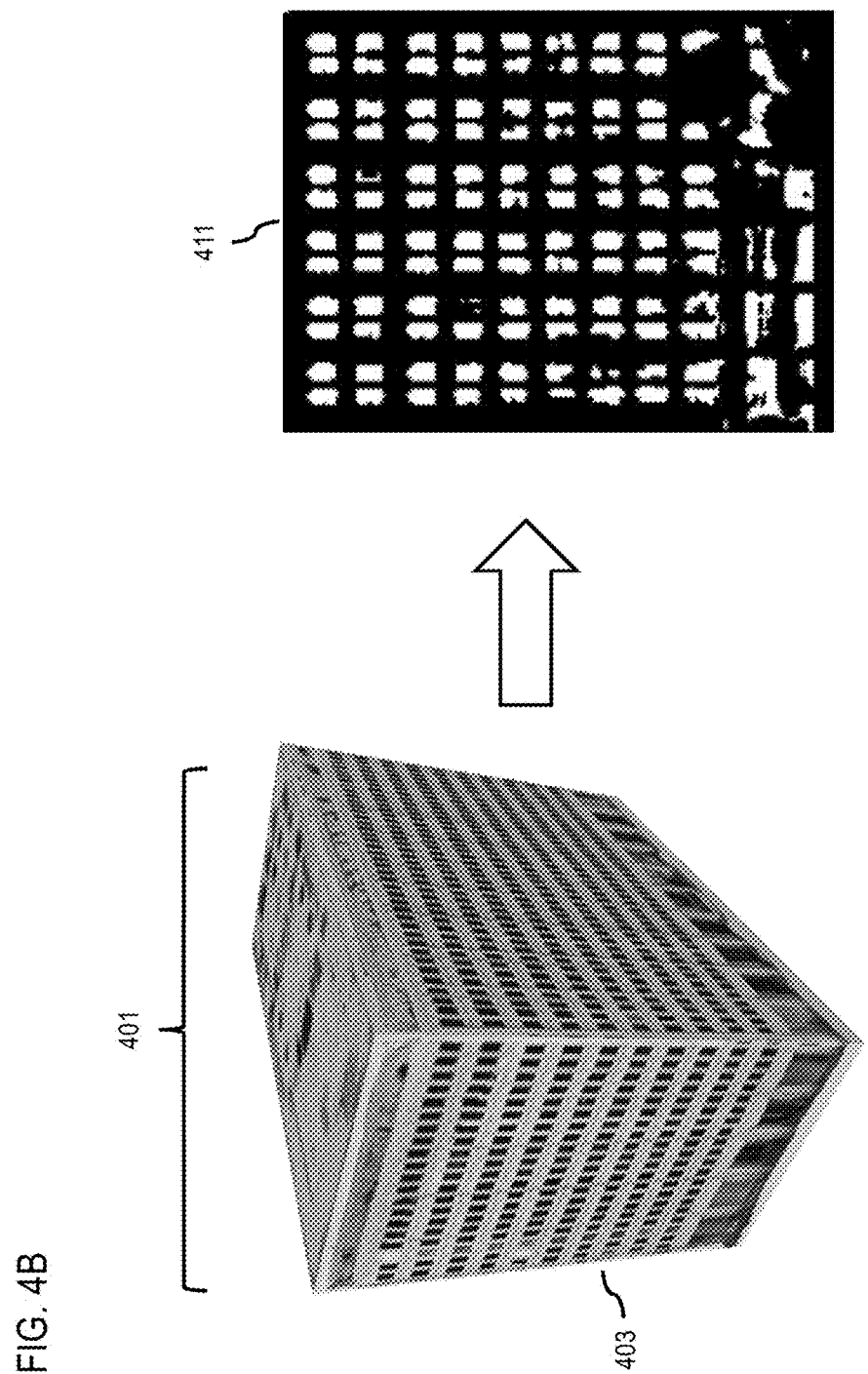

METHOD AND APPARATUS FOR GENERATING AN ABSTRACT TEXTURE FOR A BUILDING FACADE OR MODEL

BACKGROUND

Providers of mapping-related services are continually challenged to accurately map and represent features and objects (e.g., buildings, other structures, etc.) in a mapping database. For example, one area of development has been in three-dimensional mapping, which historically has been dependent on manual effort for generating accurate models (e.g., three-dimensional models) of map features or objects (e.g., buildings and/or their facades). However, because of the vast numbers of objects that may be present in a mapped geographical area, creating textures to realistically render the models of each object or feature can be a significant resource burden. Accordingly, service providers face significant technical challenges for efficiently creating textures which realistically represent real world objects such as buildings.

Some Example Embodiments

Therefore, there is a need for an approach for generating an abstract texture for a building facade or model.

According to one embodiment, a computer-implemented method for generating abstract texture data comprises receiving pixel-level labeling data for an image depicting at least a portion of a building facade. The pixel-level labeling data labels each of a plurality of pixels of the image as either window pixels or non-window pixels. The method further comprises processing the pixel-level labeling data to determine window size data, window spacing data, or a combination thereof. The method further comprises generating a window pattern based on the window size data, the window spacing data, or a combination thereof. The method further comprises computing a confidence score for the window pattern based on at least one observed value at least one characteristic of the window pattern or a deviation of the observed value from at least one expected value. The method further comprises generating an abstract texture for an object model of the building facade represented in the image based on the window pattern, the confidence score, and/or other probabilistic metrics.

According to another embodiment, an apparatus for generating abstract texture data comprises at least one processor, and at least one memory including computer program code for one or more computer programs, the at least one memory and the computer program code configured to, with the at least one processor, cause, at least in part, the apparatus to receive pixel-level labeling data for an image depicting at least a portion of a building facade. The pixel-level labeling data labels each of a plurality of pixels of the image as either window pixels or non-window pixels. The apparatus is further caused to process the pixel-level labeling data to determine window size data, window spacing data, or a combination thereof. The apparatus is further caused to generate a window pattern based on the window size data, the window spacing data, or a combination thereof. The apparatus is further caused to compute a confidence score for the window pattern based on at least one observed value of at least one characteristic of the window pattern or a deviation of the observed value from at least one expected value. The apparatus is further caused to generate an abstract texture for an object model of the building facade represented in the image based on the window pattern, the confidence score, and/or other probabilistic metrics.

According to another embodiment, a non-transitory computer-readable storage medium generating abstract texture data carries one or more sequences of one or more instructions which, when executed by one or more processors, cause, at least in part, an apparatus to receive pixel-level labeling data for an image depicting at least a portion of a building facade. The pixel-level labeling data labels each of a plurality of pixels of the image as either window pixels or non-window pixels. The apparatus is further caused to process the pixel-level labeling data to determine window size data, window spacing data, or a combination thereof. The apparatus is further caused to generate a window pattern based on the window size data, the window spacing data, or a combination thereof. The apparatus is further caused to compute a confidence score for the window pattern based on at least one observed value of at least one characteristic of the window pattern or a deviation of the observed value from at least one expected value. The apparatus is further caused to generate an abstract texture for an object model of the building facade represented in the image based on the window pattern, the confidence score, and/or other probabilistic metrics.

According to another embodiment, an apparatus for generating abstract texture data comprises means for receiving pixel-level labeling data for an image depicting at least a portion of a building facade. The pixel-level labeling data labels each of a plurality of pixels of the image as either window pixels or non-window pixels. The apparatus further comprises means for processing the pixel-level labeling data to determine window size data, window spacing data, or a combination thereof. The apparatus further comprises means for generating a window pattern based on the window size data, the window spacing data, or a combination thereof. The apparatus further comprises means for computing a confidence score for the window pattern based on at least one observed value of at least one characteristic of the window pattern or a deviation of the observed value from at least one expected value. The apparatus further comprises means for generating an abstract texture for an object model of the building facade represented in the image based on the window pattern, the confidence score, and/or other probabilistic metrics.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4C are diagrams illustrating a process for generating an abstract texture for an example building, according to one embodiment;

DESCRIPTION OF SOME EMBODIMENTS

Examples of a method, apparatus, and computer program for generating an abstract texture are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
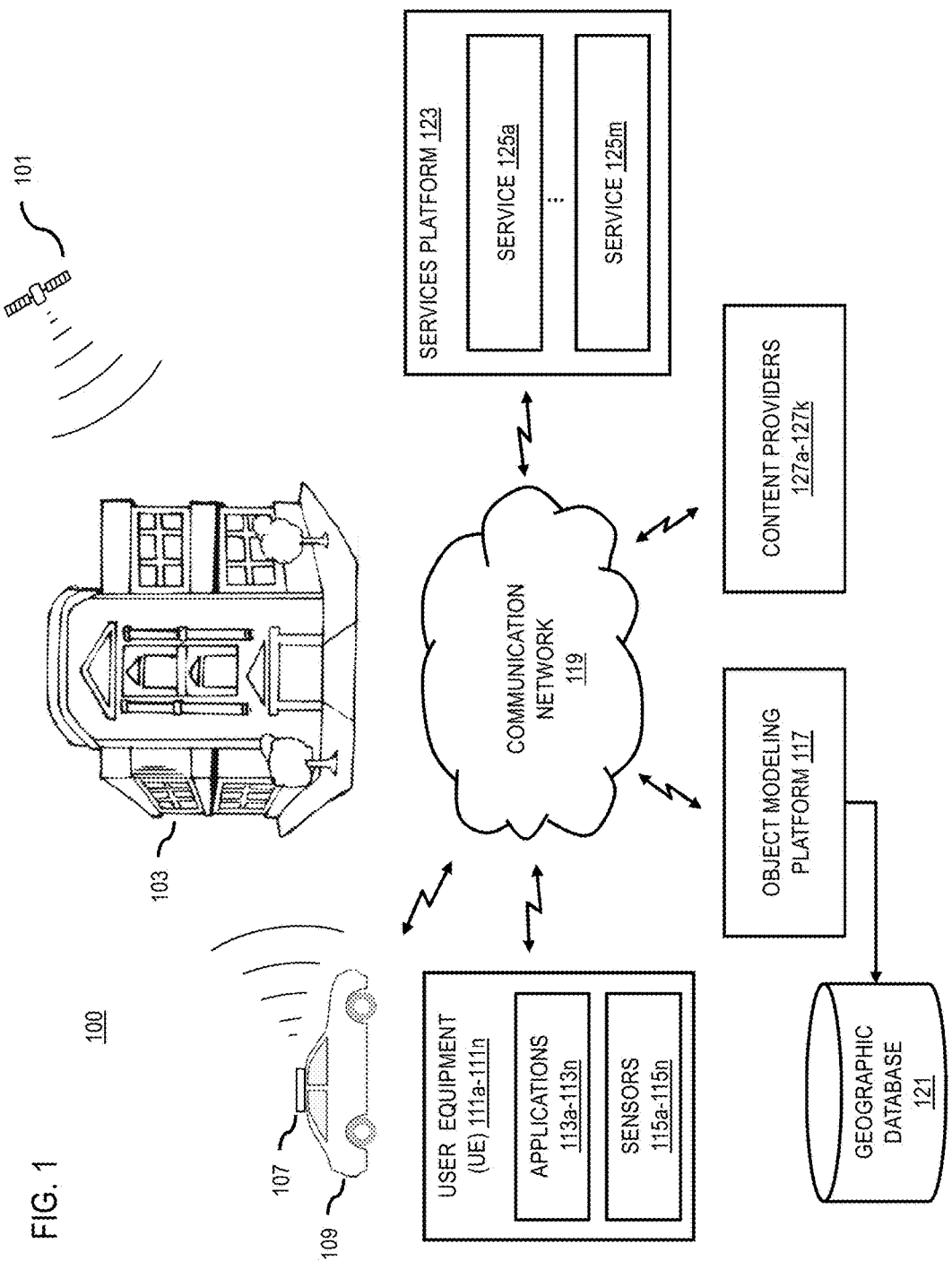
FIG. 1 is a diagram of a system capable of generating an abstract texture, according to one embodiment.

FIG. 1 is a diagram of a system capable of generating an abstract texture, according to one embodiment. As noted above, object models (e.g., three-dimensional building models) are essential features in map services across different platforms. In one embodiment, models or object models refer to computer-based three-dimensional (3D) representations of individual objects (e.g., building, structures, or individual features thereof such as facades or walls) that may be present in a mapped geographical area. For example, the model can represent a physical location, surfaces, dimensions, shape, properties, etc. of a respective object using a mathematical or other representation. One example of such a mathematical representation includes, but is not limited to, a polygon extrusion. In one embodiment, the model can be a two-dimensional representation (e.g., an object footprint), a two and half dimensional representation (e.g., an object footprint in combination with a height), or a full 3D representation.

To realistically render these models in computer applications (e.g., mapping applications, navigation applications, etc.), a texture image or map can be applied to the objects so that the rendered objects have a visual appearance that is similar to their real world counterparts. Traditionally, building textures can be drawn manually using different graphics applications, but this can be expensive and require significant, and cannot be easily scaled to generate textures for potentially millions of different objects (e.g., buildings) in a mapped area. In one embodiment, raw texture images (e.g., from aerial or satellite imager) can be used as textures. However, raw texture images captured by airborne or terrestrial cameras may suffer from heavy shadow, occlusion, image noise/distortion, glass wall reflection, and/or other problems that significantly lower image quality, as shown in the raw texture image 201 of FIG. 2. Accordingly, cleaning up and improving these raw texture images can require extensive image processing and computer vision resources. In addition, storing raw texture images can significantly increase storage requirements because these images files tend to have relatively larger file sizes.

Accordingly, map service providers face significant technical challenges to abstracting the raw texture images into an accurate and compact abstract versions of the raw textures. By way of example, an abstract texture refers to a texture that expresses the visual quality or characteristic of the corresponding raw or actual texture apart from the actual instance of the captured raw texture image. In other words, the abstract texture is a representation of the raw or actual texture while maintaining at least some of its visual characteristics. For example, with respect to buildings or building facades, such an abstraction is technically challenging because the structures, materials, window sizes/shapes/layouts, etc. can vary greatly across different buildings or even within the same building, thereby adding greater complexity. In addition, when a building or object that is modeled includes multiple facades, walls, etc., that each can have different appearances, reconciling or assembling the facades into a coherent representation can also be significant technical challenge. For example, the resulting abstract textures may be different due to lighting and/or occlusion on each facade, or the floors on each facade may not line up due to the same reason as well.

In one embodiment, a system 100 of FIG. 1 introduces a capability to use a series of automatic approaches to handle these problems, including approaches for extracting object or building features (e.g., windows, doors, etc.) that are visible in a raw image of the building or a facade of the building, and approaches for formulating patterns out of extracted object or building given windows. For example, the system 100 comprises development and quality assurance processes to generate abstract texture for a façade given photogrammetry-based window information (pixel labeling of images). In one embodiment, system 100 further extract patterns and colors of features (e.g., windows, doors, etc.) visible in the input image, and incorporates a set of quality metrics for robustness and directing the generation of the abstract texture. In one embodiment, the system 100 enables the handling of missing texture pieces due to shadows, occlusion, and/or other image defects. In yet another embodiment, the system 100 also provides automatic application of constraints or rules to assemble multiple abstract textures into a coherent object texture (e.g., assembling abstract textures generated for multiple facades of a building into a complete building model).

Although various embodiments described herein are discussed with respect to creating abstract features for objects representing buildings or walls/facades of the buildings, it is contemplated that the various embodiments are applicable to any type of object that can be modeled and represented. In addition, although the various embodiments are discussed with respect to detecting windows and doors in the raw texture data, it is contemplated that any other visible feature of the object being modeled (e.g., wall lines, floor lines, architectural features, etc.) can also be applicable to the embodiments, including non-building features for non-building objects. In this way, the system 100 can generate abstract textures for any type of object model based on any visible feature of that object according to the various embodiments described herein.

In one embodiment, when referring to building models, a "3D Building Models" can have two common meanings. In a first meaning, a "3D Building Model" can refer to a "Digital Surface Model" (DSM), a single surface that includes buildings, ground, etc. Typically, the surface consists of points, connected by triangles. In addition to describing the geometry, a DSM can describe the appearance of a building by projecting two-dimensional (2D) images to each triangle. The images mapped to the triangles, for instance, are referred to as the texture of the surface.

By way of example, a DSM is a 3D analog of a 2D photo. Just like a digital photo contains no information about which pixels are on a building or on a tree, the DSM itself has no information about which triangles are on a building and which are on a tree. A human can look at a rendering of the 2D photo or DSM and recognize different objects, for a computer perspective (e.g., from the perspective of the system 100), much processing needs to be done to partition the photo pixels or DSM triangles into logical units that represent individual real world objects (e.g., buildings, building facades, etc.).

In a second meaning, a "3D Building Model" can also refer to an object model corresponding to a logical object (such as building). Object models in this type of 3D city model are themselves surface models and the textures from the DSM or other texture source can be projected onto the surfaces of each object.

In one embodiment, for 3D building models of the latter type, textures can be photorealistic (projected from aerial, terrestrial or satellite images) or abstract (simplified representations of the raw textures, e.g., windows simplified to rectangles, etc.). Typically, textures of a DSM are generally photorealistic because information for generating the abstractions may not be available. For example, the information may not be available because such images may cover entire cities or regions, and processing the images to identify features on a pixel-by-pixel level may be too resource intensive. However, if information (e.g., pixel-level labeling data) are available for these raw textures for a DSM, those textures can also be abstracted according to the embodiments described herein.

There are at least two advantages of abstract textures. As one advantage, the simplification of shapes and colors can lead to greater data compression. For example, a digital photo of a building facade can have pixels with hundreds or thousands of different colors. An abstraction of the building facade or wall may have two colors (e.g., a wall color and a window color) or even just one color (e.g., a wall color with no windows). For another example, each window may have slightly different dimensions. But an abstract representation of the facade can represent all the windows with a single size rectangle.

Figure 2:
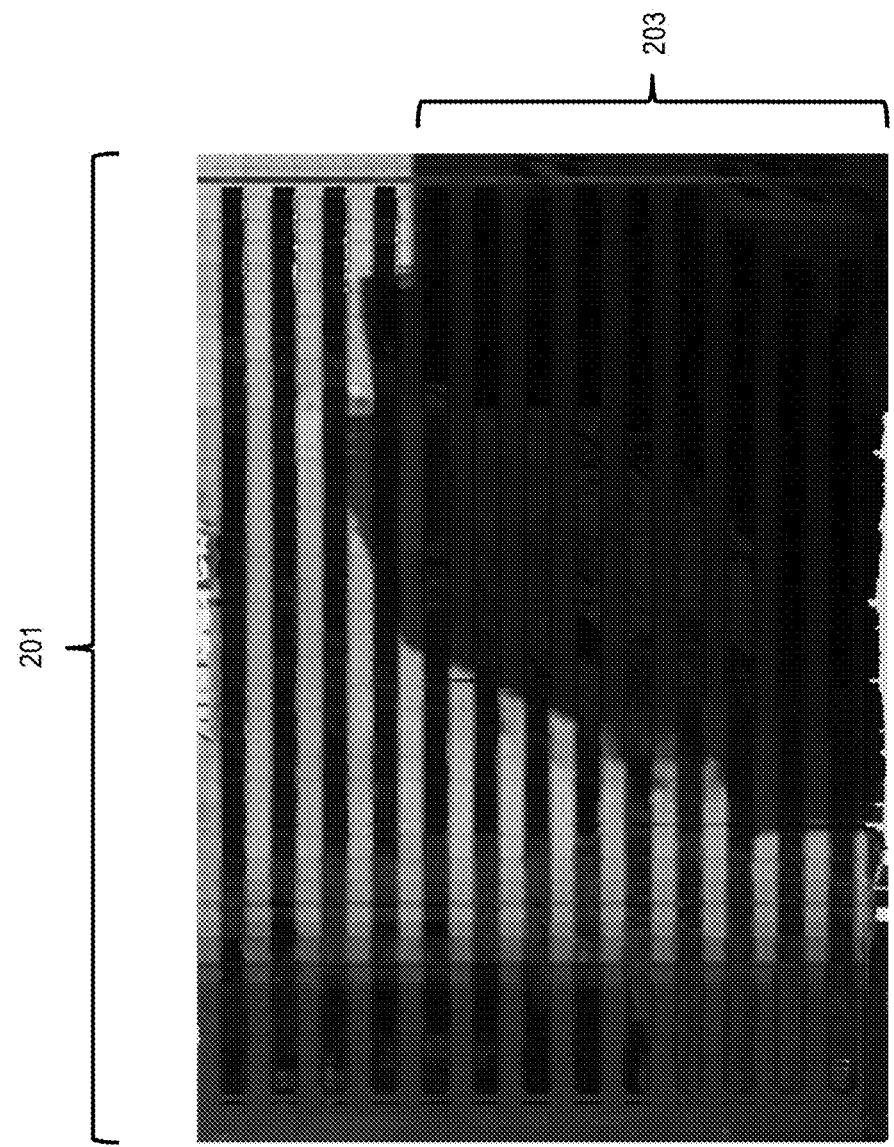
FIG. 2 is a diagram illustrating a captured wall texture image with problematic areas, according to one embodiment.

Another advantage is that portions of a raw image of facade that are distorted or otherwise obscured can be addressed by an abstract texture. As shown in FIG. 2, in a photorealistic texture 201 of a building wall or facade, some of the wall texture 201 can be obscured by trees, cars or other buildings and colors may be distorted by shadows and reflections 203. In one embodiment, an abstract texture of the facade can correct these distortions by representing the full wall (with extrapolated/interpolated windows) under ideal lighting.

Figure 3:
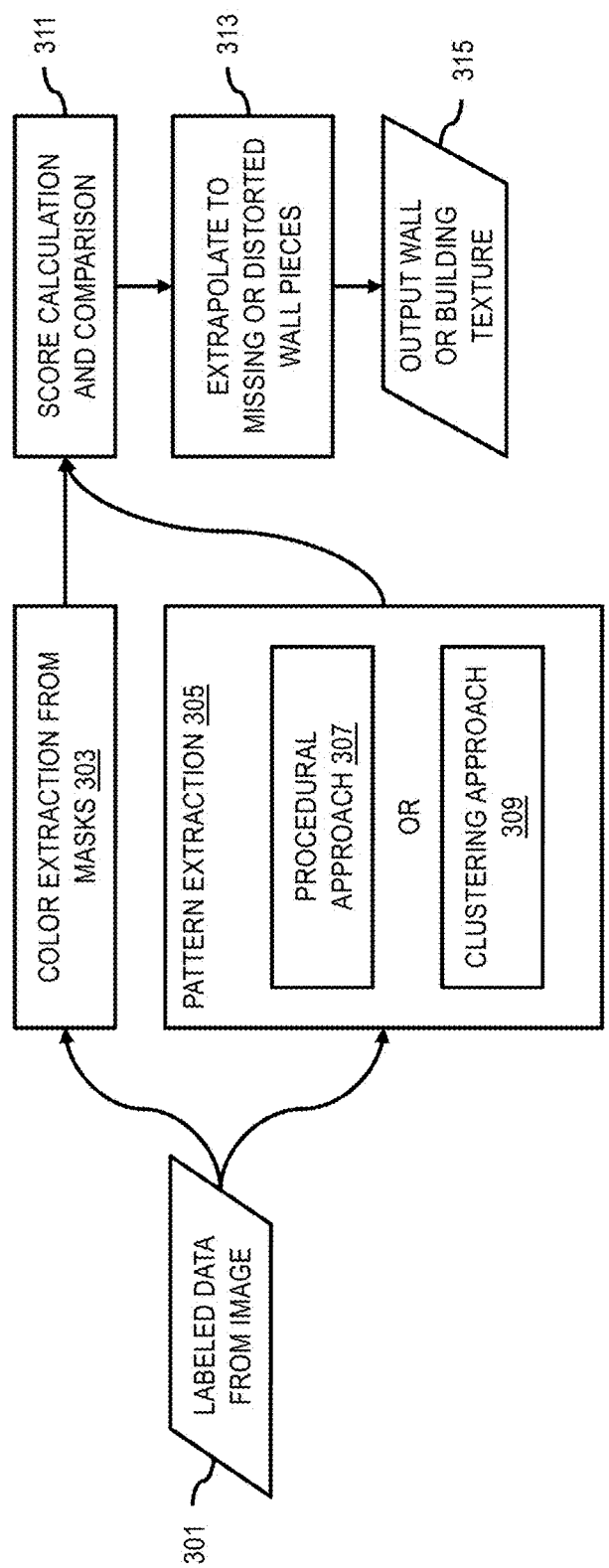
FIG. 3 is a diagram illustrating an overall process for creating an abstract texture, according to one embodiment.

In one embodiment, the system 100 enables creating an abstract texture for a single facade of a single building, or an entire building or objects (e.g., by assembling abstract textures for each facade of the building into a single texture). FIG. 3 is a diagram illustrating an overall process for creating an abstract texture, according to one embodiment. The overall process of FIG. 3 is explained with respect to the example models of FIGS. 4A-4C and FIG. 5 below.

Figure 4A:
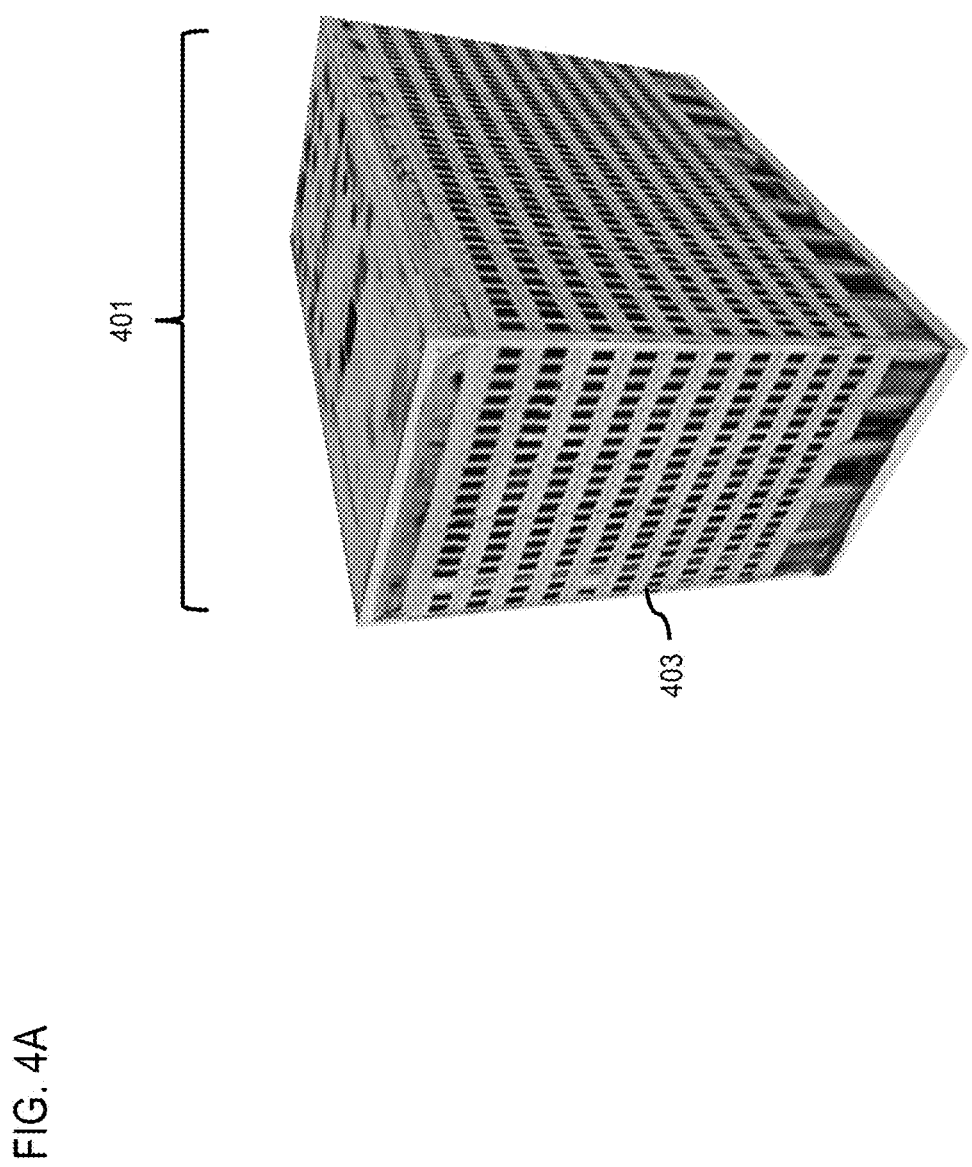

At process 301 of FIG. 3, to model window patterns (or other object feature patterns) and generate abstract textures, the system 100 takes window information (e.g., pixel-level labeling data) as the input. For example, this window information is pixel-level labeling on wall texture images showing the estimated area of windows. An example of this input is shown in FIG. 4A, which depicts a model 401 on which raw texture images 403 are used as textures of each facade of the model 401. By way of example, a raw texture image 403 can be an image from an individual facade or wall of the model 401, e.g., when generating an abstract texture for just the facade, or can be an image from all facades or walls of the model 401, e.g., when generating an abstract texture for the entire model 401. In one embodiment, the system 100 can produce this kind of window information or labeled information for input at process 401 based on, but not limited to the two example approaches described below.

In a first example approach, the system 100 can use a Fourier transform based periodicity analysis or other equivalent analysis to determine image periodicity. For example, the system 100 uses pixel color and location information from photorealistic texture images (e.g., raw texture images for aerial or satellite photography) as the input. The system 100 then applies, for instance, a Fourier transform on input image to extract image periodicity. This analysis assumes, for instance, that windows and walls have clear color distinction. In this case, the periodicity would be based on the period of the color changes between the windows and walls. With this periodicity information, the system 100 can restructure the image and tile the cell units dividing the image to reflect periodicity in both horizontal and vertical directions. The periodicity analysis can also determine the probability of each pixel being a feature (e.g., window) or non-feature.

In a second example approach, the system 100 can use a machine learning (e.g., deep learning) based extractor to identify pixels of the input image belonging to a window or other feature of the building or object being modeled. For example, with partially or fully labeled wall images (e.g., pixel-level labeling of windows, doors, walls, etc.), semi-supervised or supervised learning approaches can be used to train a deep neural network model, so as to assign a probability of being a window or other learned object feature to each pixel.

In one embodiment, under either approach, a probability threshold can be applied to the pixels to classify each pixel as a feature (e.g., window) or a non-feature (non-window). FIG. 4B illustrates an example in which the pixels of the texture image 403 of one facade of the model 401 are analyzed using either of the approaches describe above. A probability threshold then is applied to each pixel to generate an image mask 411 in which the dark areas represent the pixels with respective probabilities of being a window that are below the probability threshold, and the white areas represent the pixels with respective probabilities of being a window that are above the probability threshold. Accordingly, the white areas of the image mask 411 correspond to windows or other similar openings of the building facade in the input image.

As noted, both methods mentioned above produce the probability of each pixel being a window. However, they do not generate or compute the actual window or feature location and size. To address this issue, the system 100 can apply a morphological "open" and "close" operations to the image mask 411 generated above. For example, each of the white areas of the image mask 411 represents a window pixels. However, these white areas vary in shape and contours. To make these white areas approximate the expected shapes of windows or other features (e.g., a rectangle), the system 100 can apply the aforementioned morphological "open" or "close" operations. For example, to perform a morphological "open" operation, the system 100 can evaluate the sizes of each individual white area. If the area is above a threshold area size, then the white area is expanded or "opened" into a rectangle or other reference shape corresponding to the feature of interest (e.g., window, door, etc.). The morphological "close" operation is the opposite, with the system 100 eliminating or "closing" any white areas below the threshold area size, so as to remove any small clutters. The processed imaged mask 411 can then be used in other processes of the abstract texture generation process.

For example, in one embodiment at process 303, the system 100 can use either original or processed mask 411 to perform color extraction. In other words, the system 100 can apply the image mask 411 to the image data to isolate just the pixels corresponding to the windows or features of interest. The color for the windows or features that is to be used in the abstract texture can then be the average of the raw texture colors of the pixels corresponding to the windows or features. Similarly, the system 100 can generate an inverse of the image mask 411 to isolate just the pixels of the input that correspond to non-windows or non-features. For example, in the context of a building texture, these non-feature pixels are assumed to correspond to the wall or portion of the facade between the windows. Accordingly, the color of the walls of the building to be used in the abstract texture can be the average of the colors of the non-feature pixels. In this way, the color extraction process 303 can result in abstracting a single representative color for the features (e.g., windows) and non-features (e.g., windows) from potentially thousands of different colors or shades represented in the raw image.

In one embodiment, the system 100 can also perform the pattern extraction process 305. For example, the pattern extraction process 305 can be used to find contours and/or corresponding rectangles or shapes for each white window-like or feature-like region of the image mask 411 (e.g., original or processed as generated above). In one embodiment, for those rectangles of different sizes, the system 100 can extract window size data and/or window spacing using at least the two types of approaches described below (e.g., procedural approach 307 or clustering approach 309), or any other equivalent approach.

In one embodiment, they system 100 performs the procedural approach 307 by finding the window-like or feature-like shapes of the image mask 411. Given those shapes (e.g., rectangles or other corresponding shapes), the system 100 can then find the mode of widths, heights, and/or other dimensions of all shapes, and the spacing between those shapes. Accordingly, in one embodiment, the values for feature size and/or spacing (e.g., window size and spacing) with the most occurrence are set as the default feature size and spacing for the object of interest (e.g., facade/wall, building, etc.).

In one embodiment, the system 100 performs the clustering-based approach 309 using any clustering method known in the art (e.g., k-means clustering). For example, the selected clustering method can be applied to those feature shapes (e.g., rectangles) with feature vectors consisting of shape dimensions and spacing (e.g., rectangle width/height and horizontal/vertical spacing between rectangles). The average feature dimensions (e.g., rectangle size) in the biggest resulting size cluster is considered as the dominant feature size, and similarly, the average spacing in the biggest resulting spacing cluster is considered as the dominant feature spacing for the object of interest.

In one embodiment, after obtaining the candidate size and spacing of the features for generating the abstract texture, the system 100 can compute a confidence score that indicates a probability that a resulting abstract texture is representative of the raw input image (at process 311). This confidence score is, for instance, part of the probabilistic framework for generating abstract textures. By way of example, the system 100 can use any metric reflecting a quality or characteristic of the determined feature or window pattern, corresponding abstract texture, etc. including, but not limited to, the metrics discussed below.

In one embodiment, floor height can be a quality metric. For example, the degree to which the floor height is consistent with the system 100's expectations of buildings (for example, the first floor of a commercial building is often taller than higher floors, upper floors tend to have the same height, floor height usually falls into a common range and fall around 10 feet in height, etc.). The system 100 can compute the floor height from the vertical spacing and/or feature heights (e.g., window heights) of the determined feature or window pattern. In one embodiment, the metric can be based on how closely the observed floor height is from the expected or default floor height for the building.

In one embodiment, feature size and shape can be a quality metric. For example, with respect to windows as the selected feature, the degree to which the window size determined in the window pattern meets expectations of windows (e.g., similar size on the same floor of the same building) can be used to calculate the confidence score.

In one embodiment, color can be a quality metric. For example, the calculated colors for the features (e.g., windows) and non-features (e.g., walls) of the object can be compared to respective expected colors for the features and non-features to calculate the confidence score. In other words, with respect to a building facade or similar object, the system 100 can determine the extent to which the calculated wall and window colors are similar to dominant colors on that facade.

In yet another embodiment, metrics from the previous clustering step discussed above to generate the feature pattern can be used as a quality metric. For example, the clustering metrics can include, but are not limited to, compactness score, cluster count and size, standard deviation, etc.

In one embodiment, the system 100 can use the confidence and/or the quality metrics used to determine the confidence score to direct the abstract texture generation process. For example, in one embodiment, the system 100 can set a confidence score threshold, and then redo pattern or abstract texture generation process if the current score does not meet the threshold. In yet another embodiment, the system 100 can select a top N dominant clusters generated above, and then generate respective feature patterns from each of the top N clusters. The system 100 can then calculate the confidence scores for each respective feature pattern. In one embodiment, the system 100 can then designate the highest-scoring pattern as the final pattern for generating the abstract texture.

In one embodiment, the confidence score and/or the metrics contributing to the confidence score are signals for how closely the resulting abstract texture will follow or represent the input images. In addition, the system 100 can use the confidence score to determine when the system 100 should intentionally deviate from a given area of the texture. For example, areas with confidence scores or metrics that do not meet criteria may indicate that the corresponding area of the input is degraded or otherwise obscured (e.g., by shadows, occlusions, reflections, etc.). Accordingly, for these areas, the system 100 can instead extrapolate the abstract texture from neighboring areas to address the potentially degraded or obscured portion of the input image.

In one embodiment, the probabilistic framework of the system 100 approaches the problem of generating abstract textures as a maximization of likelihood and gives us a systematic and automatic way to generate the abstract texture. In contrast, minimization of deviations just results in an abstract texture that potentially reflects all the errors and distortions of the input images.

As noted above, in one embodiment, the system 100 enables extrapolations of an abstract texture to missing pieces of the object of interest (e.g., missing wall or building pieces) in the raw input image. For example, in many cases, there exist heavy shadows or occlusions (caused by trees, nearby buildings or street objects) on raw wall textures, like the distortions shown in FIG. 2 above. Therefore, in one embodiment, after feature pattern generation using, for instance, the process 305, they system 100 can extrapolate or interpolate the pattern or resulting abstract texture to missing or distorted pieces on of the input image (at process 313).

In one embodiment, to determine if a wall is partially degraded, the system 100 can perform clustering to find if there are large pieces of shadows, occlusions, reflections, etc. using pixel color and pixel location in the input image as features. In addition or alternatively, the system 100 can determined the existence of occlusions (e.g. by tree), and to some extent shadows and reflections, when there is an area lacking texture beyond threshold criteria.

After identifying the distorted or missing areas of texture, the system can extrapolate the generated pattern or abstract texture to the missing area. In one embodiment, several factors can affect the confidence level of the extrapolation, such as, but not limited to, occlusion location (in the corner, whole floor, or vertical stripe), degradation type (shadow vs. tree), etc. For example, for occlusion location, if a whole entrance or lower level of a building texture is missing, the extrapolated pattern from higher levels may not be accurate. For degradation type, if the type is a shadow, some low-quality texture may have already been generated, and so the system 100 can further process or evaluate the resulting potentially low-quality textures by comparing to actual information about the occlusion determined from the input image.

Figure 4C:
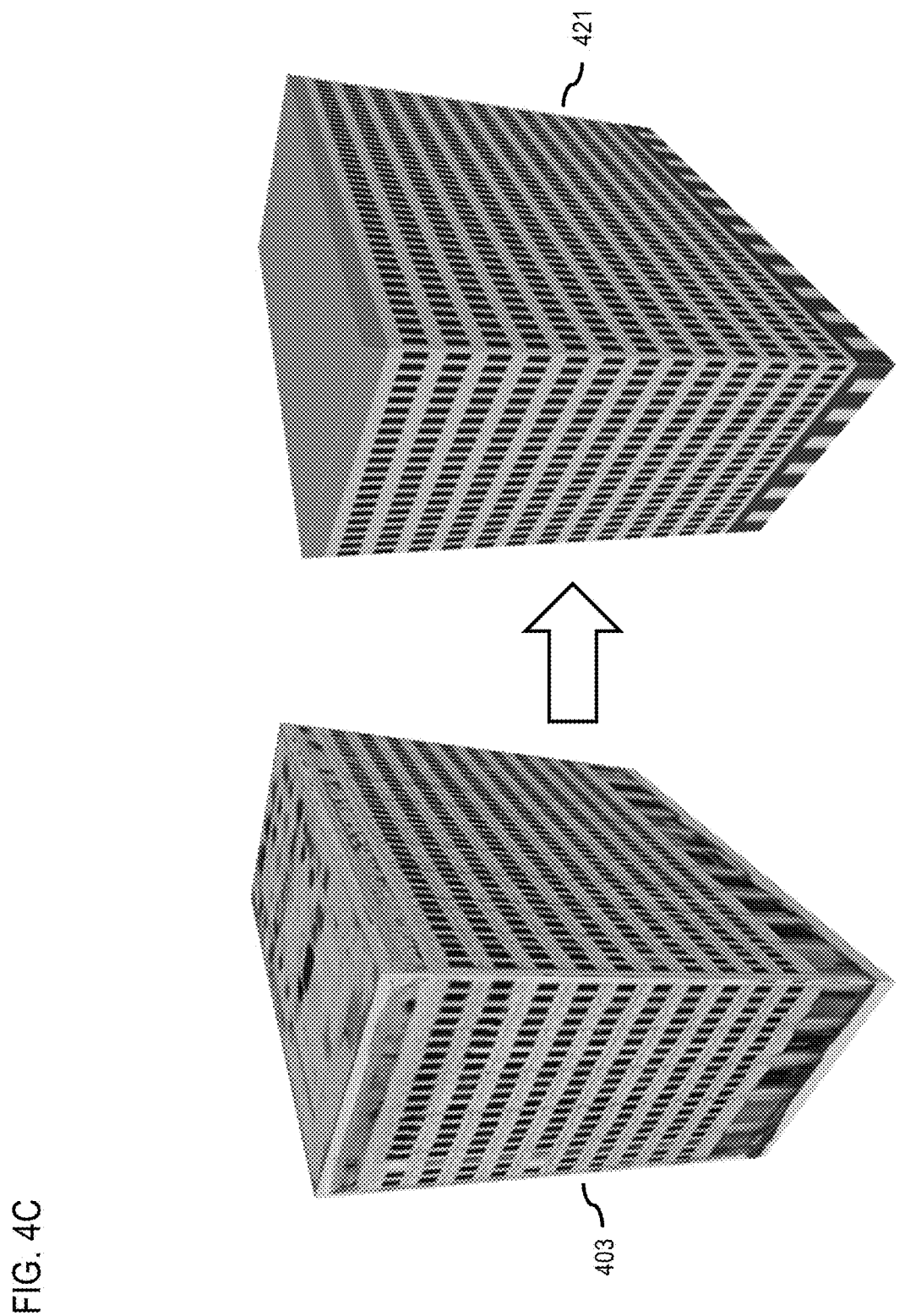

In one embodiment, at process 315, the system 100 can output the resulting abstract texture. For example, as shown in FIG. 4C, the raw texture image 403 is processed to generate the abstract texture 421 that abstracts the windows size, spacing, and colors of the raw texture image 403 to automatically create the abstract texture 421. The abstract texture 421 provides the advantages discussed above while maintaining the main visual features of the raw texture image 403 to make the rendered model still recognizable by an end user.

In one embodiment, the system 100 can be used generate multiple abstract textures for different portions (e.g., different facades or walls, different portions of the same facade or wall, etc.) of a single object (e.g., a building). In this case, the system 100 can generate respective abstract textures independently each of the different portions by applying inter-wall and/or intra-building constraints.

For example, using the embodiment described herein, the system 100 generates an abstract texture for each individual portion (e.g., wall) of the object (e.g., building) given corresponding raw texture images. However, in one embodiment, the system 100 does not simply put those textures together to form a building model. This is because there may be differences between the generated multiple abstract textures that may make the assembled building model less representative or realistic. For example, in reality, each facade or portion of the object may have slightly different abstract texture outputs even if they have same texture pattern due to lighting, occlusion, etc. On the other hand, although some walls look different, they should still make users people feel that the abstract textures belong to the same building. Therefore, in one embodiment, the system 100 can use constraints and/or prior knowledge to determine how multiple abstract textures should be assembled to create a complete object or building model. Examples of the constraints and prior knowledge include, but are not limited to, those discussed below.

In one embodiment, the system 100 assembles multiple abstract textures so that opposite facades have the same texture (e.g., the same window pattern and colors). By way of example, this constraint is derived from real world experience and for visual effect purpose. In one embodiment, if the opposite facades have different abstract textures, the texture of higher-scoring façade is copied to the opposite facade.

In one embodiment, the system 100 assembles multiple abstract textures so that floors, windows, or other features are aligned across all facades or sides of the object (e.g., building). By way of example, the system 100 can match the floor heights or feature alignment/spacing to the highest-scoring facade texture. The match, for instance, can be performed by changing the vertical spacing of features in the pattern. For example, windows in the abstract textures can be moved up or down slightly to match floor locations.

In one embodiment, the system 100 can apply a simple constraint by assembling multiple abstract textures so that feature colors (e.g., wall and window colors) are the same respectively across all facades. For example, the system 100 can use the colors of the highest-scoring facade for the abstract textures of all facades. In another embodiment, the system 100 can apply a more complicated constraint. For example, the complicated constraint can specify that opposite facades should have the same color, while the differences between colors of non-opposite facades should fall within a range that is defined by average and deviation of object's or building's dominant colors.

In one embodiment, when the object is a building, the system 100 can assemble multiple abstract textures so that an entrance level height of respective abstract textures are the same across all facades. This constraint is based on an observation that the height of the first floor of a building (e.g., the entrance level) often can be higher than the floor heights of higher floors of the building. Accordingly, the determined entrance level height of each facade can be made consistent by, for instance, selecting the entrance level height of the highest scoring facade and making other facades have the same entrance level height.

Figure 5:
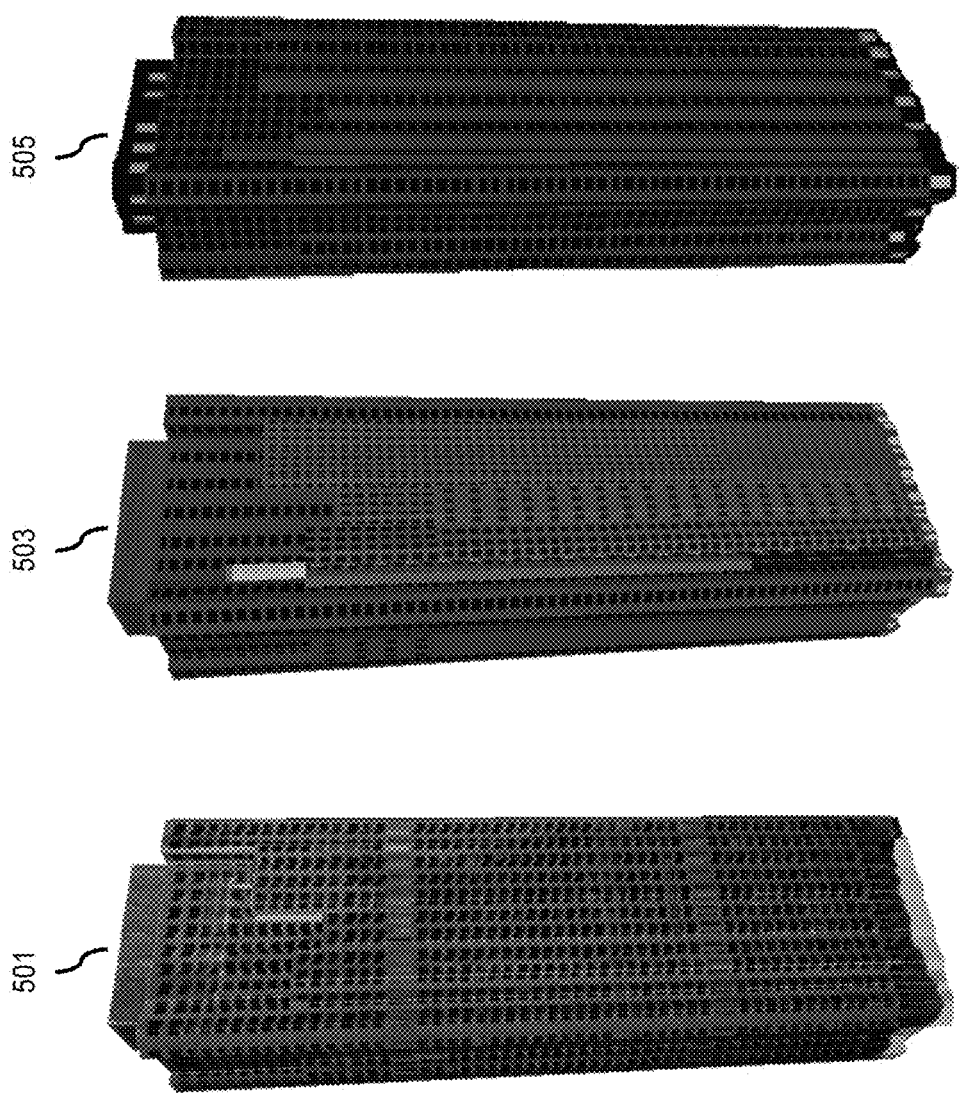
FIG. 5 is an example of assembling multiple abstract textures for an example building according to constraint rules, according to one embodiment.

In one embodiment, all constraints above are enforced in a probabilistic fashion to make sure the best texture pattern can be robustly picked out. This probabilistic approach involves, for instance, applying the constraints based on the confidence scores calculated form the respective abstract textures being assemble. In this way, the system 100 can advantageously generate a building or object model that has a set of reasonably-looking abstract textures that also reflects the visual appearance of the real world building or object. FIG. 5 illustrates an example of assembling multiple abstract textures for an example building according to constraint rules, according to one embodiment. As shown in the FIG. 5, the raw image textures 501 of a building is processed to generate respective abstract textures 503. In this example, the resulting abstract textures 503 have slightly different window patterns and colors. The system 100 can apply the constraint rules discussed above to generate a final set of abstract textures 505 to more accurately represent the raw image textures 501, and make the resulting final set of abstract textures 505 appear more visually coherent (e.g., so that users feel like the textures are from the same building and not patch worked together as shown in abstract textures 503).

Returning to FIG. 1, in one embodiment, a system 100 of FIG. 1 can generate the object models for which abstract textures can be generated using any known mechanism or process. One example of such a process is extraction of the object models from a surface model. In one embodiment, a surface model is a single triangulated surface or triangular mesh that represents or depicts a large geographical area (e.g., an entire city). The surface model, for instance, can be generated from aerial or satellite photogrammetry. FIG. 1 illustrates an example in which a satellite 101 (or other aerial vehicle such as an airplane, drone, helicopter, or other aerial vehicle) is used to collect sensed data (e.g., image data and/or any other surveying data collected by any other surveying sensors equipped in the satellite 101) about an object 103 (e.g., a building object) and its geographical surroundings to generate the surface model. In one embodiment, the aerial or satellite image data used in the photogrammetry process to generate the object models can also be used to generate raw texture images of the models according to the various embodiments described herein.

In addition or alternatively, the sensed data can also be collected or received from other sources such as from an airplane equipped with cameras, LiDAR, or other surveying technologies (not shown). In one embodiment, the process for extracting object models from surface models include determining regions of interest (ROIs) of the surface models which correspond to individual objects (e.g., buildings, trees, cars, other structures, etc.) based on the geometry of the surface model.

In one embodiment, the point cloud data (e.g., mobile LiDAR data) used for model creation can be collected using a sensor 107 (e.g., LiDAR sensor or camera) mounted on a vehicle 109 traveling in the area of the target object 103. In one embodiment, the point cloud data is a collection of multiple individual points defined within a coordinate system (e.g., a latitude, longitude, and elevation in three-dimensional coordinate system). For example, with respect to LiDAR measurements, each individual point within the point cloud data represents a coordinate of a point at which laser light emitted from the LiDAR sensor is reflected back to the sensor. The collection of points then can be plotted in three-dimensional space to depict an outline of the surfaces of the target object 103 that reflected the laser light. In one embodiment, because the vehicle 109 travels at a street level, the point cloud data depicts the target object 103 from a street level perspective. In one embodiment, the perspective or sensor 107 pose information can be stored or otherwise associated with the point cloud data. This perspective or pose information, for instance, can be used to facilitate data alignment for object model creation.

In addition or alternatively, the point cloud data and/or the object models can be captured or generated using one or more user equipment 111*a*-111*n* (also collectively referred to as UEs 111). The UEs 111 are, for instance, mobile devices that can be respectively configured with data collection applications 113*a*-113*n* (also collectively referred to as applications 113) and sensors 115*a*-115*n* (also collectively referred to as sensors 115) for generating point cloud data and/or data for building object objects. By way of example, the sensors 115 include, but are not limited to, mobile LiDAR sensors, cameras, stereo cameras, video cameras, infrared cameras, mobile RADAR sensors, and/or any other surveying sensors.

Accordingly, in one embodiment, the system 100 takes inputs from either of the two data sources: (1) point cloud data (e.g., street level point cloud generated from mobile LiDAR) and (2) object models (e.g., three-dimensional polygon extrusions generated from aerial or satellite photogrammetry). In one embodiment, the object models and point cloud data from the data sources are received by an object modeling platform 117 over a communication network 119. In one embodiment, the object modeling platform 117 uses the received data to perform the functions related to generating abstract textures for object or building models as described with respect to the various embodiments described herein. In one embodiment, the object models and their raw and/or abstract texture data can be stored in or retrieved from a geographic database 121.

By way of example, the UE 111 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. In one embodiment, the UE 111 can be a component of or otherwise associated with the vehicle 109. It is also contemplated that the UE 111 can support any type of interface to the user (such as "wearable" circuitry, etc.). In one embodiment, the vehicle 109 may have cellular or Wi-Fi connection either through inbuilt communication equipment or from the UE 111 associated with the vehicle 109.

In one embodiment, the applications 113 executing on the UE 111 or the vehicle 109 may be used to render object models with the abstract textures generated according to the embodiments described herein. By way of example, the applications 113 may be any type of application that is executable at the UE 111 or the vehicle 109, such as location-based service applications, navigation applications, mapping application, sensor monitoring applications, sensor data collection applications, calendar applications, content provisioning services, camera/imaging application, media player applications, social networking applications, and the like.

As discussed above, the system 100 may also include sensors 107 of the vehicle 109 and sensors 115 of the UEs 111. By way of example, the sensors 107 and 115 may be any type of sensor, which may interface with or be included in the satellite 101, the vehicle 109, and/or the UEs 111. In certain embodiments, the sensors 107 and/or 115 may include, for example, a global positioning sensor for gathering location data (e.g., GPS, Inertial Measurement Unit), a network detection sensor for detecting wireless signals or receivers for different short-range communications (e.g., Bluetooth, Wi-Fi, Li-Fi, near field communication, etc.), temporal information sensor, a camera/imaging sensor for gathering image data (e.g., monoscopic or stereoscopic cameras), an audio recorder for gathering audio data, and the like. In one scenario, the sensors 107 and/or 115 may include, light sensors, orientation sensors augmented with height sensing and acceleration sensing, tilt sensors to detect the degree of incline or decline of the vehicle along a path of travel, moisture sensors, pressure sensors, etc. In another embodiment, the sensors 107 and/or 115 may be a LiDAR device or sensor, a laser device, and/or other surveying device that collects data points, such as three dimensional data, by transmitting and receiving light. For example, the LiDAR sensors use one or more lasers to collect data points representing on-ground objects in a surrounding area. The LiDAR sensors may collect and gather data points in a point cloud, such as a three dimensional point cloud, in which each data point corresponds to a local coordinate, such as (x, y, z). In one scenario, LiDAR sensors not only collect street level (i.e., outdoor) 3D point clouds, but also indoor three dimensional point clouds.

By way of example, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

Figure 7:
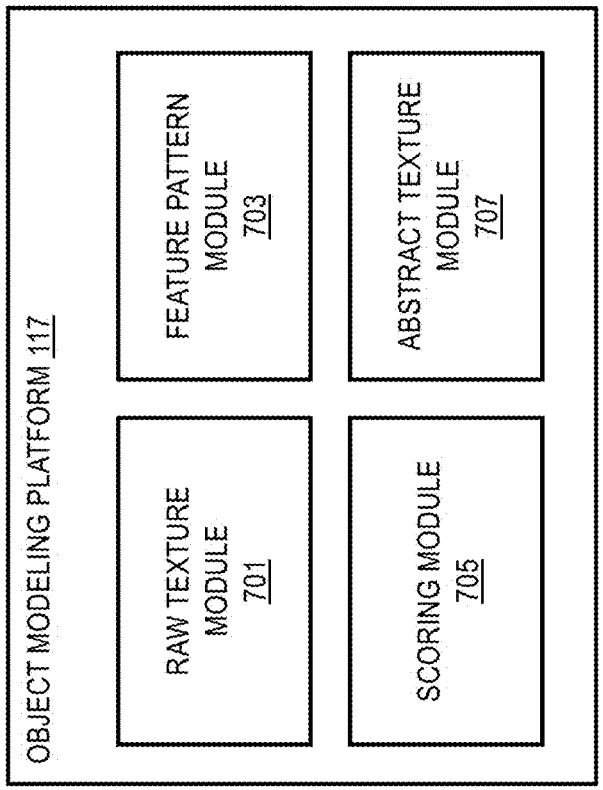
FIG. 7 is a diagram of an object modeling platform, according to one embodiment.

In one embodiment, the object modeling platform 117 may include multiple interconnected components. The object modeling platform 117 may include multiple servers, intelligent networking devices, computing devices, algorithms, components and corresponding software for classifying objects that are present at a geo-location and providing an uncluttered presentation of images of some of the objects in an application such as a map application. Example components of the object modeling platform 117 is illustrated in FIG. 7 and further discussed below.

In one embodiment, the object modeling platform 117 may include or have access to the geographic database 121 to access or store any kind of data, such as object models and associated abstract textures and related data. Data stored in the geographic database 113 may, for instance, be provided by the satellite 101, the sensors 107, the vehicle 109, the UEs 111, a services platform 123, one or more services 125a-125m (also collectively referred to as services 125), and/or one or more content providers 127a-127k (also collectively referred to as content providers 127). In one embodiment, the geographic database 121 may also include data about places, such as cities, towns, or other communities, and other geographic features, such as bodies of water, mountain ranges, buildings, etc. The geographic database 121 may be maintained by the content providers 127 in association with the services platform 123 (e.g., a map developer). The map developer may collect geographic data to generate and enhance the geographic database 121. The data may be obtained from various sources, such as municipalities or respective geographic authorities. In addition, direct collection (e.g., via a fleet of sensor equipped vehicles 109 using, for instance, mobile LiDAR), and/or remote sensing (e.g., aerial or satellite photography, and/or aerial LiDAR), may be used.

The services platform 123 may include any type of service 125 that can read or write to the geographic database 121 including, but not limited to services that can render object or building models and corresponding abstract textures. By way of example, the services platform 123 may include mapping services, navigation services, social networking services, content (e.g., audio, video, images, etc.) provisioning services, application services, storage services, contextual information determination services, location based services, information (e.g., weather, traffic, news, etc.) based services, etc. In one embodiment, the services platform 123 may interact with the object modeling platform 117 to supplement or aid in the processing of generating cleaned object models according to the various embodiments described herein. For example, the services platform 123 and/or the services 125 may provide: (1) object models; (2) point cloud data; (3) alignment information for aligning the models and point cloud data; and/or (4) classification information for classifying object models, model fragments, points with the point cloud data, etc.

The content providers 127 may also read or write to the geographic database 121 to provide content to the object modeling platform 117, and the services 125 of the services platform 123. The content provided may be any type of content, such as object models, raw textures, abstract textures, point cloud data, and related information (e.g., alignment information, classification information, etc.). Other examples of content include, but are not limited to, textual content, image content, video content etc. In one embodiment, the content providers 127 may also store content or data associated the object modeling platform 117, the services 125 of the services platform 123, and/or any other component of the system 100. In a further embodiment, the content providers 127 may manage access to a central repository of data, and offer a consistent, standard interface to data.

By way of example, the object modeling platform 117 may communicate over the communication network 119 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
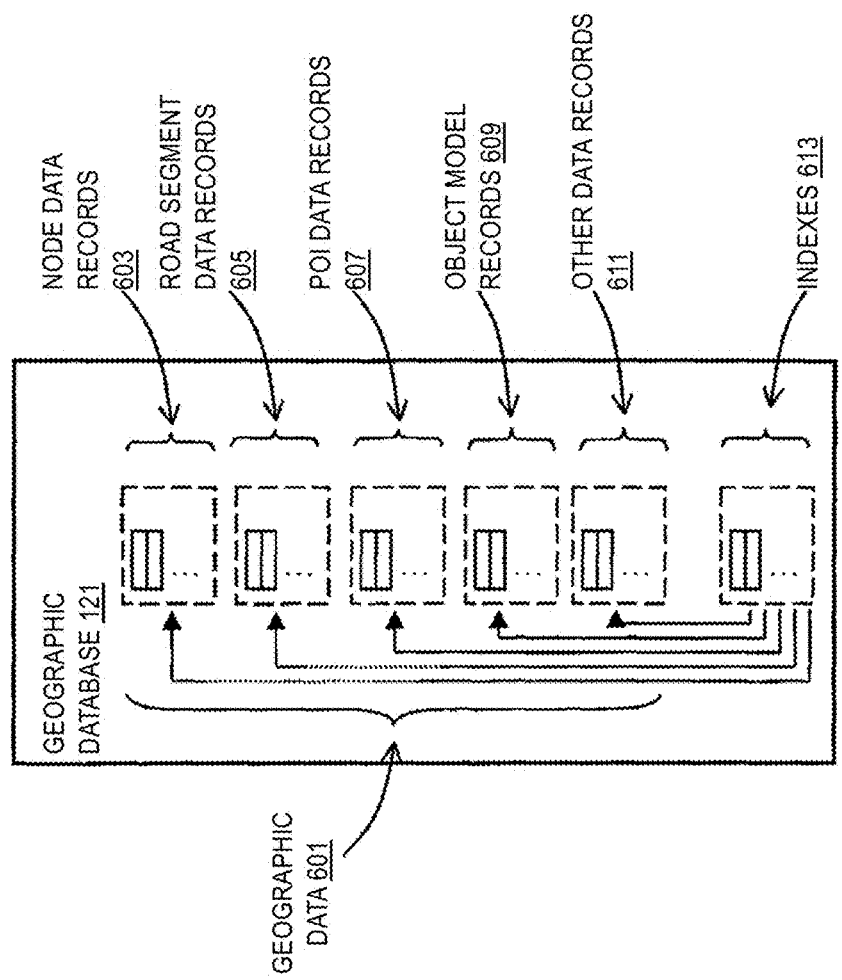
FIG. 6 is a diagram of a geographic database, according to one embodiment.

FIG. 6 is a diagram of the geographic database 121 of system 100, according to exemplary embodiments. In the exemplary embodiments, object models (e.g., cleaned and unleaded), model fragments, point cloud data, and/or related information (e.g., data alignment information, classification information, etc.) can be stored, associated with, and/or linked to the geographic database 121 or data thereof. In one embodiment, the geographic database 121 includes geographic data 601 used for (or configured to be compiled to be used for) mapping and/or navigation-related services, such as for personalized route determination, according to exemplary embodiments. For example, the geographic database 121 includes node data records 603, road segment or link data records 605, POI data records 607, object model records 609, other data records 611, and indexes 613, for example. More, fewer or different data records can be provided. In one embodiment, additional data records (not shown) can include cartographic ("carto") data records, routing data, and maneuver data. In one embodiment, the indexes 613 may improve the speed of data retrieval operations in the geographic database 121. The indexes 613 may be used to quickly locate data without having to search every row in the geographic database 121 every time it is accessed.

In exemplary embodiments, the road segment data records 605 are links or segments representing roads, streets, or paths, as can be used in the calculated route or recorded route information for determination of one or more personalized routes, according to exemplary embodiments. The node data records 603 are end points corresponding to the respective links or segments of the road segment data records 605. The road link data records 605 and the node data records 603 represent a road network, such as used by vehicles, cars, and/or other entities. Alternatively, the geographic database 121 can contain path segment and node data records or other data that represent pedestrian paths or areas in addition to or instead of the vehicle road record data, for example.

In one embodiment, the object model records 609 store information on objects models (e.g., building models) and corresponding abstract textures, confidence scores computed for the abstract textures, and related data used to generate the abstract textures according to the various embodiments described herein. The object model records 609 can also store the raw texture images from which the abstract textures can be generated. In one embodiment, the system 100 can archive, delete, or otherwise remove the raw textures from the object model records after the abstract textures are generated. In one embodiment, the confidence score computed for each abstract texture or assembled building object can stored as a single value and/or stored as individual values of the underlying quality metrics used to compute the confidence score.

In one embodiment, the geographic database 121 can be maintained by the content provider 127 in association with the services platform 123 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database 121 or data in the master geographic database 121 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the object modeling platform 117, vehicle 109, and/or UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 121 can be a master geographic database, but in alternate embodiments, the geographic database 121 can represent a compiled navigation database that can be used in or with end user devices (e.g., vehicle 109, UE 111, etc.) to provide navigation-related functions. For example, the geographic database 121 can be used with the end user device to provide an end user with navigation features. In such a case, the geographic database 121 can be downloaded or stored on the end user device (e.g., vehicle 109, UE 111, etc.), such as in application 113, or the end user device can access the geographic database 121 through a wireless or wired connection (such as via a server and/or the communication network 119), for example.

Furthermore, the geographic database 121 or compiled features thereof can be provided as a cloud service. In one embodiment, the geographic database 121 is presented according to a hierarchical or multi-level tile projection. More specifically, in one embodiment, the geographic database 121 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

In one embodiment, the geographic database 121 may identify a tile by a quadkey determined based on the tile ID of a tile of the map tile grid. The quadkey, for example, is a one dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one dimensional array of the quadkey. In another example, the length of the one dimensional array of the quadkey may indicate the corresponding level within the map tile grid. In one embodiment, the quadkey is an example of the hash or encoding scheme of the respective geographical coordinates of a geographical data point that can be used to identify a tile in which the geographical data point is located.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 111) can be a cellular telephone. An end user can use the device navigation functions such as guidance and map display, for example, and for determination of route information to at least one identified point of interest, according to exemplary embodiments.

FIG. 7 is a diagram of the components of the object modeling platform 117, according to one embodiment. By way of example, the object modeling platform 117 may include one or more components for generating an abstract texture according to the various embodiments described herein. In one embodiment, the object modeling platform 117 includes a raw texture module 701, a feature pattern module 703, a scoring module 705, and an abstract texture module 707. The above presented modules and components of the object modeling platform 117 can be implemented in hardware, firmware, software, or a combination thereof. Though depicted as a separate entity in FIG. 1, it is contemplated that the object modeling platform 117 may be implemented as a module of any of the components of the system 100. In another embodiment, one or more of the modules 701-707 may be implemented as a cloud based service, local service, native application, or combination thereof. The functions of these modules are discussed with respect to FIGS. 8 and 9 below.

Figure 8:
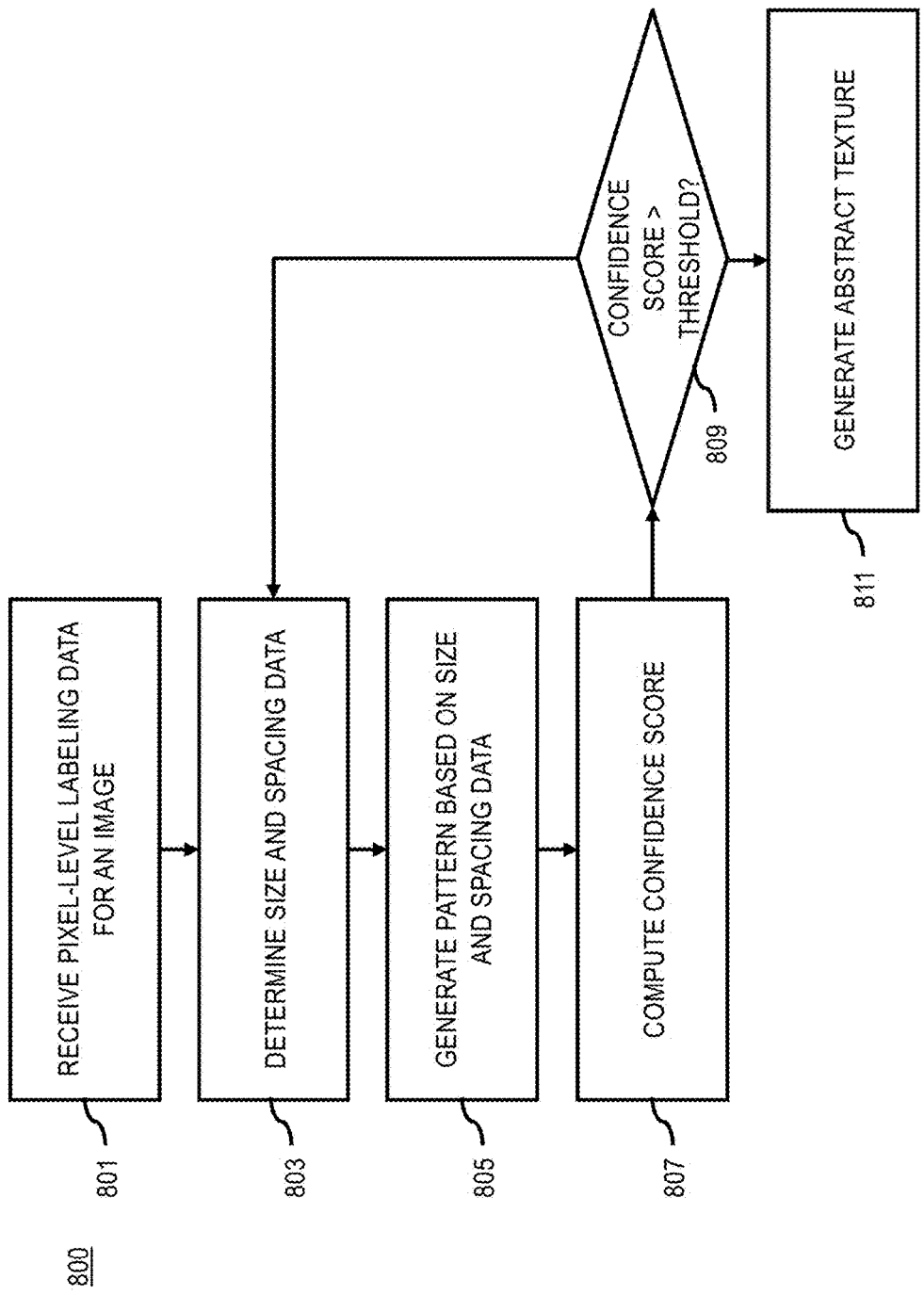
FIG. 8 is a flowchart of a process for generating an abstract texture, according to one embodiment.
Figure 11:
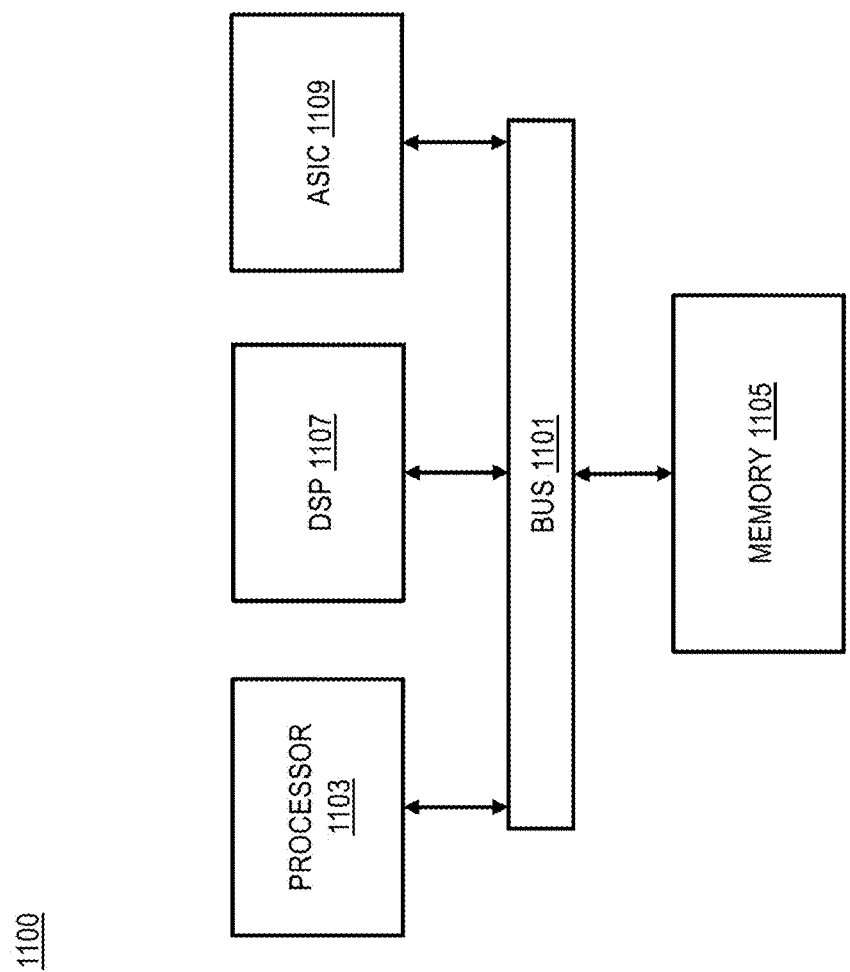
FIG. 11 is a diagram of a chip set that can be used to implement an embodiment of the invention.

FIG. 8 is a flowchart of a process for generating an abstract texture, according to one embodiment. In various embodiments, the object modeling platform 117 and/or any of the modules 701-707 of the object modeling platform 117 as shown in FIG. 7 may perform one or more portions of the process 800 and may be implemented in, for instance, a chip set including a processor and a memory as shown in FIG. 11. As such, the object modeling platform 117 and/or the modules 701-707 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

It is noted that although the process 800 as well as the process 900 of FIG. 9 below are described with respect to generating abstract textures for building facades and building models, it is contemplated that the processes are also applicable to generating textures for any type of object model that represents any object represented in, for instance, the geographic database 121. In addition, although the processes are also discussed with respect to determine "windows" and "window patterns" to generate an abstract texture, the various embodiments of the processes can also be used with any combination of features of a building (e.g., doors, wall lines, floor lines, architectural details, etc.) visible in the raw texture images. Moreover, when the object is a not a building object, it is contemplated that the features may include any visible surface features of the object. Accordingly, the terms buildings, building facades, walls, objects, portions of objects, sides of objects, and/or the like can be used interchangeably in the description provided for the process 800 and process 900 below, as well as other portions of the specification. In addition, the terms windows, doors, floors, features, and/or the like can also be used interchangeably in the descriptions below, as well as in other portions of the specification.

In step 801, the raw texture module 701 receives pixel-level labeling data for an image depicting at least a portion of a building facade. The image, for instance, is a raw texture image captured from aerial or satellite imagery of the real-world building facade. The pixel-level labeling data labels each of a plurality of pixels of the image as either window pixels or non-window pixels. In one embodiment, the labeling can be performed using any process known in the art including, but not limited to, a Fourier transform based periodicity analysis or a deep learning feature extractor as described above. In one embodiment, the pixel-level labeling data need not include a specific label (e.g., window or non-window pixel). Instead the data may specify for each pixel a probability that the pixel depicts either a window or non-window feature (e.g., a wall).

In one embodiment, as part of processing the pixel-level labeling data, the raw texture module 701 optionally creates a subset of the image data comprising the plurality of pixels labeled as the window pixels. For example, the raw texture module 701 can query the pixel-level labeling data for those pixels associated with a window label. If probability data is provided instead of labels for each pixel, the raw texture module 701 can apply a probability threshold to create the subset of window pixels. For example, if the probability threshold is 0.75, then those pixels with probabilities of depicting windows greater than or equal to 0.75 can be grouped in the subset. In another embodiment, the subset can be created using an image mask as discussed above.

In step 803, the feature pattern module 703 processes the pixel-level labeling data (or the subset if created) to determine window size data, window spacing data, and/or other feature characteristics (e.g., window color, or the color other objects of features of the buildings). In one embodiment, determining the window size data, the window spacing data, and/or any other feature characteristics comprises creating an image mask based on the pixel-level labeling data to distinguish between the window pixels and the non-window pixels of the image. As described above, the feature pattern module 703 then identifies a plurality of window shapes (e.g., rectangles for windows) in the image mask. The shapes can vary depending on known architectural details of the building (e.g., circular windows instead of rectangular windows). The shapes can also vary according to the specific type of feature or model (e.g., rectangles for doors and windows of a building model, circles for portholes of a ship model, etc.). After identifying the shapes, the feature pattern module 703 can compute a mode of one or more dimensions of the plurality of window shapes, a mode of one or more spacings between the plurality of window shapes, or a combination thereof. The window size data is based on the mode of the one or more dimensions of the plurality of windows. The window spacing data is based on the mode of the one or more spacings between the plurality of window shapes.

In another embodiment, the feature pattern module 703 clusters the plurality of window shapes or other feature shapes into a plurality of clusters based on one or more dimensions of the plurality of window shapes, a plurality of spacings between the plurality of window shapes, or a combination thereof. The feature pattern module 703 then selects a cluster from among the plurality of clusters based on a cluster size. The window size data is based on an average window size of the plurality of window shapes the in the selected cluster. The window spacing data is based on an average window spacing between the plurality of window shapes in the selected cluster.

In another embodiment, the feature pattern module 703 applies the image mask to the image data to generate the subset of the image data comprising the plurality of pixels labeled as the window pixels. The feature pattern module 703 determines the window color for the abstract texture based on color data of the subset. For example, the feature pattern module 703 can select a window or feature color based on averaging the color values in the subset, taking most frequently occurring color in the subset, and/or any equivalent means. The feature pattern module 703 then applies an inverse of the image mask to the image data to generate another subset of the image comprising the plurality of pixels labeled as the non-window or non-feature pixels. The feature pattern module 703 then similarly determines a non-window color for the abstract texture based on color data of this other subset.

In step 805, the feature pattern module 703 generates a window pattern based on the window size data, the window spacing data, and/or other feature characteristics (e.g., color). For example, the window or feature pattern can indicate the repeating sizes of the windows or features (e.g., both vertical and horizontal dimensions) as well as the vertical and horizontal spacing between the features. In one embodiment, the sizes and spacings can be selected so that they are uniform over the pattern. In another embodiment, the window or feature pattern can also specify periodic changes in sizes and/or spacing within the overall pattern to result in a more complex pattern. In one embodiment, the window pattern also includes the color data for the window and non-window pixels determined above.

In step 807, the scoring module 705 computes a confidence score to that indicates a probability or likelihood that the generated pattern is representative of the features of the raw texture image or of the real-world building or object. For example, in one embodiment, the confidence score for the window pattern can be based on at least one observed value of at least one characteristic of the window pattern or a deviation of the observed value from at least one expected value. By way of example, as discussed above, the at least one characteristic includes a floor height computed from the window size data and the window spacing data, a window size, a window shape, a texture color, one or more clustering metrics, or combination thereof. In other words, the scoring module 705 compares the resulting pattern to characteristics such as feature dimensions and/or properties (e.g., color) that are known about the real-world building or object. The degree of the difference can be used to compute the confidence score.

In step 809, the scoring module 705 determines whether the confidence score is greater than a threshold value. When the confidence score is greater than the threshold value (e.g., indicating that the abstract texture is likely to represent the visual characteristics of the building to object to a desired probability), the abstract texture module 707 generates and outputs an abstract texture for an object model of the building facade represented in the image based on the window pattern and the confidence score (step 811). By way of example, the generating and outputting the abstract texture comprises transforming the generated feature or window pattern into a visual representation (e.g., an image) that can be applied to the surface of the corresponding object model when rendered for display at a device. In one embodiment, the abstract texture can be generated as an image file or data. Alternatively, the abstract texture can be generated as a parametric representation of the visual characteristics of the abstract texture (e.g., vector based representation) that can then be applied as a texture when the corresponding object is rendered.

In one embodiment, the original raw texture image can be potentially obscured with shadows, occlusions, reflections, etc. As a result the textures for that affected sections of the depicted building or object may not be available or may otherwise not satisfy the confidence score or other quality metric discussed above. In this case, the process of generating the abstract texture also comprises determining an obscured portion of the image. By way of example, the abstract texture module 707 determines the obscured portion of the image by clustering the plurality of pixels according to a pixel color, and/or evaluating the confidence score for abstract textures generated for the affected texture area (e.g., low scores indicating insufficient quality of the abstract texture). The abstract texture module 707 then extrapolates the window pattern to generate the abstract texture associated with the obscured portion of the image. For example, the clustering of the pixels by color and location in the image can identify the affected areas of the image, these affected pixels correspond to the area of the building or object for which an extrapolated texture is needed.

When the confidence score is less than the threshold value, the feature pattern module 703 regenerates the window pattern, for instance, by returning to step 803. In one embodiment, the feature pattern module 703 regenerates the window pattern by identifying a plurality of candidate windows in the subset. The feature pattern module 703 then clusters the plurality of candidate windows into a plurality of clusters based on the window size data and the window spacing data. The feature pattern module 703 selects a subset of the plurality of clusters (e.g., the top N largest clusters), and generates respective candidate abstract textures and associated confidence score for each cluster. The feature pattern module 703 then regenerates the abstract texture based on the selected subset of the plurality of clusters by selecting the candidate abstract texture with the highest confidence score, and extrapolating the texture to remaining portions of the building or object.

Figure 9:
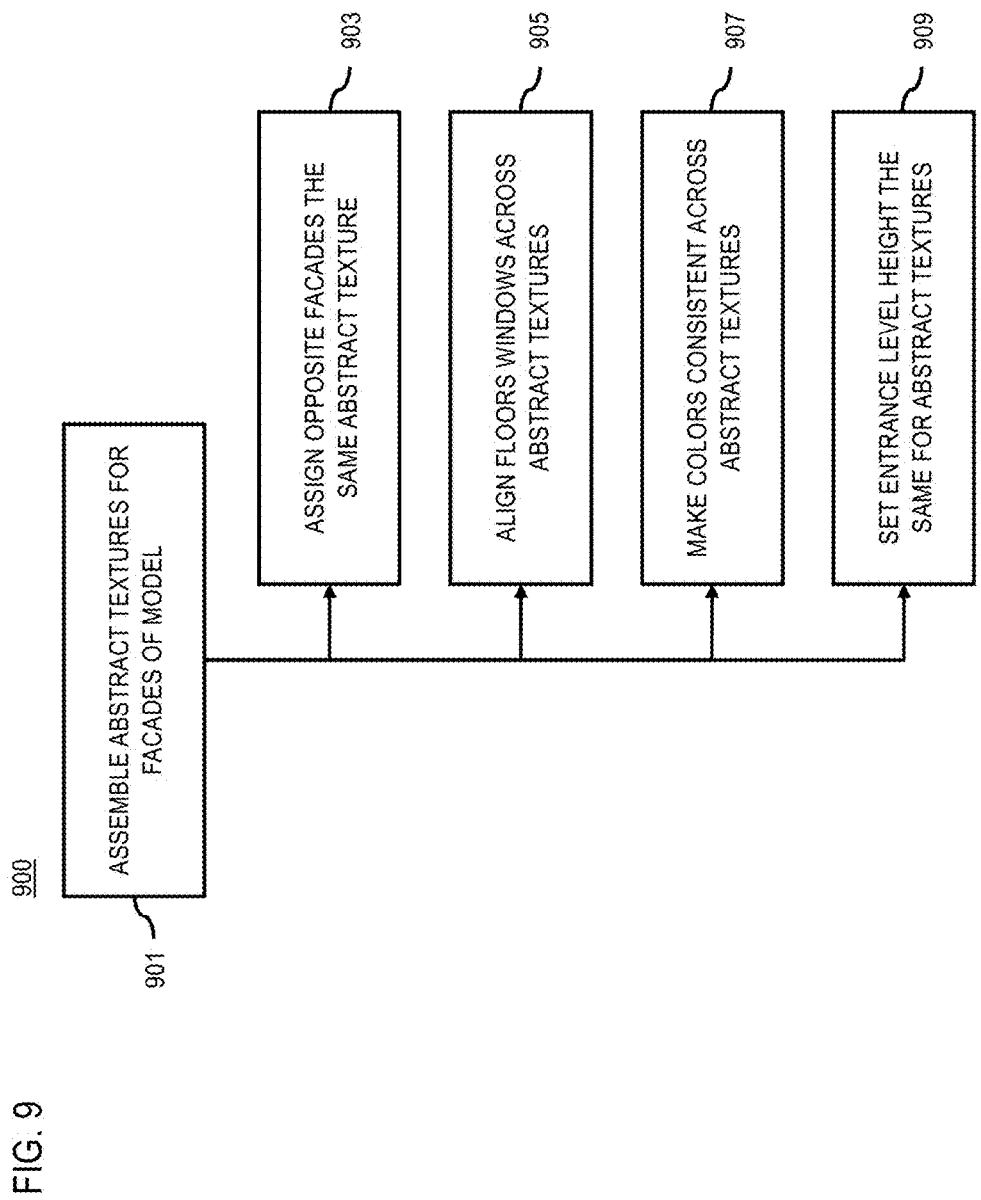
FIG. 9 is a flowchart of a process for applying inter-wall/intra-building constraints to assemble multiple abstract textures, according to embodiment.

FIG. 9 is a flowchart of a process for applying inter-wall/intra-building constraints to assemble multiple abstract textures, according to embodiment. In various embodiments, the object modeling platform 117 and/or any of the modules 701-707 of the object modeling platform 117 as shown in FIG. 7 may perform one or more portions of the process 900 and may be implemented in, for instance, a chip set including a processor and a memory as shown in FIG. 11. As such, the object modeling platform 117 and/or the modules 701-707 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

In one embodiment, the object model is a model of a building for which the building facade is among a plurality of facades of forming the building. Therefore, when constructing a complete building model (e.g., covering all or multiple facades of the building or object), the object modeling platform 117 can separately generate abstract textures for each facade or side of the building to create a model for the entire building or object.

For example, in step 901, the abstract texture module 707 assembles the abstract features generated for the facades of the building model by enforcing one or more of the constraint rules described below in steps 903-909. The constraints, for instance, provide rules, parameters, and/or processes that describe how combine or align abstract textures for different facades or sides of the building object. In one embodiment, the constraint rules of the steps 903-909 can applied alone or in any combination.

In step 903, the abstract texture module 707 determines an opposite facade from among the plurality of facades of the building. The opposite facade is opposite to the building facade for which an abstract texture is generated. The abstract texture module 707 then applies the same abstract texture to the opposite facade. If the opposite facade also has a generated abstract texture, the abstract texture module 707 can interact with the scoring module 705 to determine which of the opposing facades has an abstract texture with a higher confidence score. The abstract texture of the facade with the highest confidence score can then be applied to both opposing facades. In other words, abstract textures and respective confidence scores can be determined for both the opposite facades. The abstract texture module 707 selects between the abstract textures generated for each of the opposing facades based on which abstract texture has a higher confidence score or other probabilistic metric. The abstract texture with the higher confidence score can then be applied to both of the opposing facades.

In step 905, the abstract texture module 707 aligns a plurality of floors, a plurality of windows, or a combination thereof depicted in the abstract textures of the building when applying the textures to the object model. As discussed above, because each abstract texture is generated independently for each facade using the process 800 of FIG. 8 above, small differences in lighting, occlusions, and/or other defects in the respective raw texture images can result in variances in the computed window patterns and resulting abstract textures. Accordingly, to make the building model appear consistent to a user, the floors (e.g., derived from the vertical spacing and vertical heights of the windows) can be aligned so that the match across all facades of the building. Alternatively, because the floors are derived from window spacing, the windows or other features depicted in the abstract textures can be aligned to generate the building model.

In step 907, the abstract texture module 707 makes the colors of the assembled textures consistent by performing any of the following steps alone or in combination: (1) specifying the same window color, same non-window color, or combination thereof for the abstract textures for all of the plurality of facades; (2) specifying the same window color, the same non-window color, or a combination thereof for opposite facades of the plurality of facades; and (3) specifying window colors within a defined range, and non-window colors within another defined range, or a combination thereof for non-opposite facades of the plurality of facades.

In step 909, the abstract texture module 707 sets a height of an entrance level of the building depicted in the abstract textures to be the same. As discussed above, a building may have a first floor or entrance level whose height can be higher than the heights of other floors in the building. To make the resulting building model consistent, the abstract texture module 707 compares the depicted heights of the entrance level for all abstract textures of the building to make them all the same height. In one embodiment, the abstract texture module 707 interacts with the scoring module 705 to select the abstract texture of the building model with the highest confidence score. The abstract texture module 707 then modifies the other abstract textures to have the same entrance level height as the selected texture to assemble the building model.

The processes described herein for generating an abstract texture for an object model may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
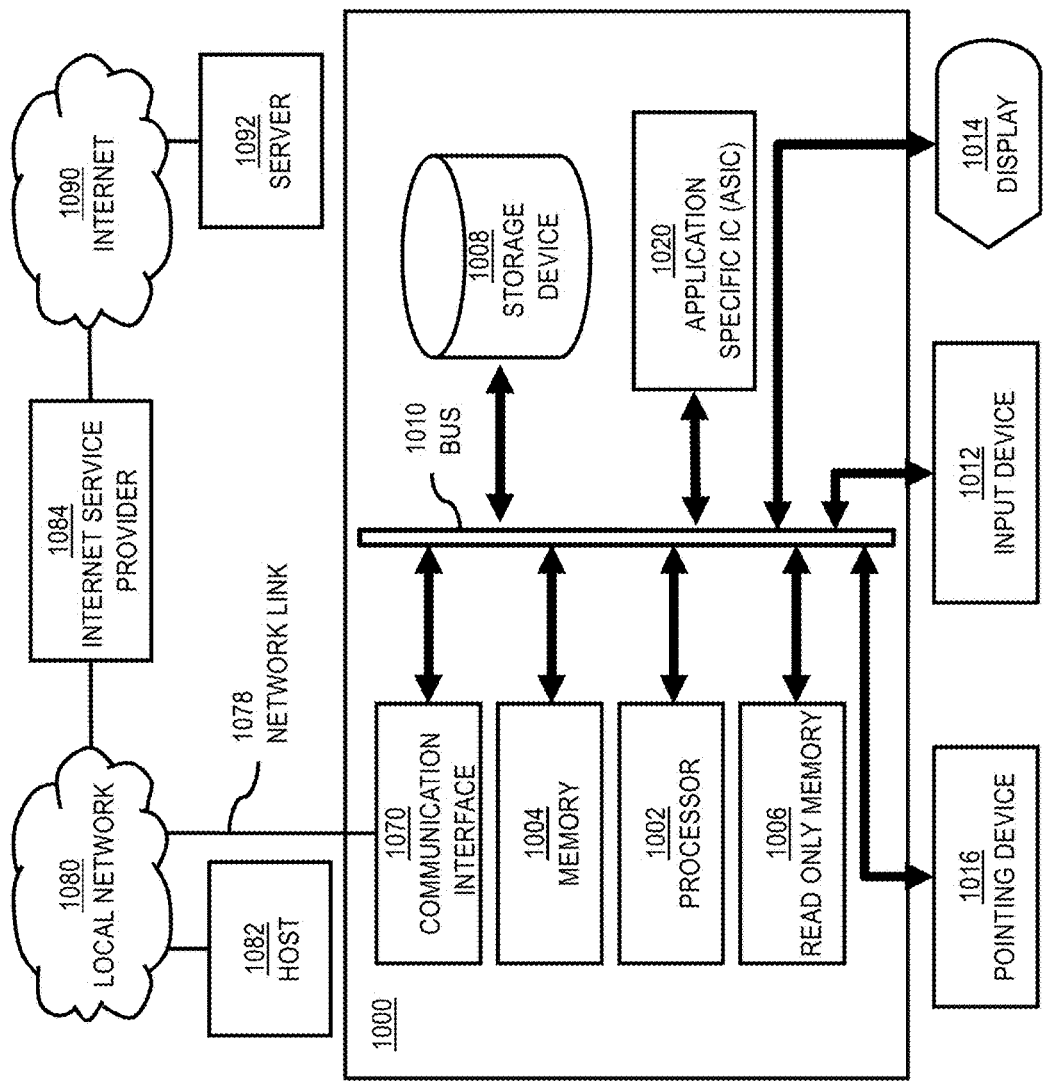
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to generate an abstract texture for an object model as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to generate an abstract texture for an object model. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for generating an abstract texture for an object model. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for generating an abstract texture for an object model, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 119 for generating an abstract texture for an object model.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to generate an abstract texture for an object model as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to generate an abstract texture for an object model. The memory 1105 also stores the data associated with or generated by the execution of the inventive steps.

Figure 12:
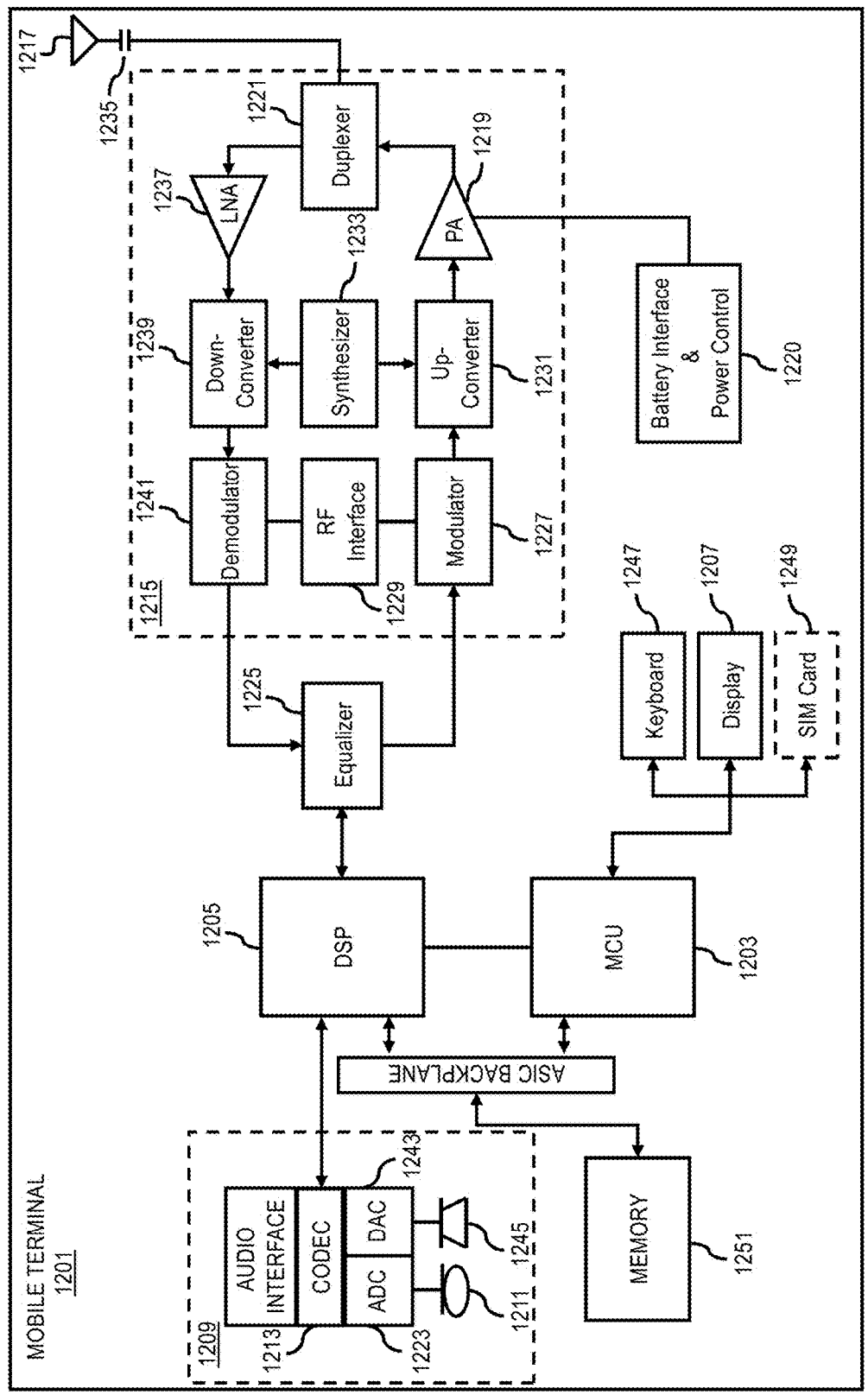
FIG. 12 is a diagram of a mobile terminal that can be used to implement an embodiment of the invention.

FIG. 12 is a diagram of exemplary components of a mobile terminal 1201 (e.g., handset, navigation system, vehicle or parts thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to generate an abstract texture for an object model. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for generating abstract texture data comprising:
   receiving pixel-level labeling data for an image depicting at least a portion of a building facade, wherein the pixel-level labeling data labels each of a plurality of pixels of the image as either window pixels or non-window pixels;
   processing the pixel-level labeling data to determine window size data, window spacing data, or a combination thereof;
   generating a window pattern based on the window size data, the window spacing data, or a combination thereof;
   computing a confidence score for the window pattern based on at least one observed value of at least one characteristic of the window pattern or a deviation of the at least one observed value from at least one expected value; and
   generating an abstract texture for an object model of the building facade represented in the image based on the window pattern when the confidence score is greater than a threshold value.

2. The method of claim 1, further comprising:
   regenerating the window pattern when the confidence score is below the threshold value.

3. The method of claim 1, further comprising:
   identifying a plurality of candidate windows in the subset;
   clustering the plurality of candidate windows into a plurality of clusters based on the window size data and the window spacing data;
   selecting a subset of the plurality of clusters; and
   regenerating the abstract texture based on the selected subset of the plurality of clusters.

4. The method of claim 1, wherein the at least one characteristic includes a floor height computed from the window size data and the window spacing data, a window size, a window shape, a texture color, one or more clustering metrics, or combination thereof.

5. The method of claim 1, further comprising:
   determining an obscured portion of the image; and
   extrapolating the window pattern to generate the abstract texture associated with the obscured portion of the image.

6. The method of claim 5, further comprising:
   determining the obscured portion of the image by clustering the plurality of pixels according to a pixel color.

7. The method of claim 1, further comprising:
   creating an image mask based on the pixel-level labeling data to distinguish between the window pixels and the non-window pixels of the image.

8. The method of claim 7, further comprising:
   identifying a plurality of window shapes in the image mask; and
   computing a mode of one or more dimensions of the plurality of window shapes, a mode of one or more spacings between the plurality of window shapes, or a combination thereof,
   wherein the window size data is based on the mode of the one or more dimensions of the plurality of windows; and
   wherein the window spacing data is based on the mode of the one or more spacings between the plurality of window shapes.

9. The method of claim 7, further comprising:
   clustering the plurality of window shapes into a plurality of clusters based on one or more dimensions of the plurality of window shapes, a plurality of spacings between the plurality of window shapes, or a combination thereof; and
   selecting a cluster from among the plurality of clusters based on a cluster size,
   wherein the window size data is based on an average window size of the plurality of window shapes in the selected cluster; and
   wherein the window spacing data is based on an average window spacing between the plurality of window shapes in the selected cluster.

10. The method of claim 7, further comprising:
    applying the image mask to the image data to generate the subset of the image data comprising the plurality of pixels labeled as the window pixels;
    determining a window color for the abstract texture based on color data of the subset;
    applying an inverse of the image mask to the image data to generate another subset of the image comprising the plurality of pixels labeled as the non-window pixels;
    determining a non-window color for the abstract texture based on color data of the another subset.

11. The method of claim 1, wherein the object model is a model of a building for which the building facade is among a plurality of facades of forming the building.

12. The method of claim 11, further comprising:
    determining an opposite facade from among the plurality of facades, wherein the opposite facade is opposite to the building facade for which the abstract texture is generated;
    determining another abstract texture and another confidence score associated with the another abstract texture;
    selecting between the abstract texture and the another abstract feature based on which of the confidence score and the another confidence score is higher; and
    applying the selected abstract texture to both the building facade and the opposite facade.

13. The method of claim 11, further comprising:
    generating other abstract textures respectively for other facades of the plurality of facades; and
    aligning a plurality of floors, a plurality of windows, or a combination thereof depicted in the abstract texture and the other abstract textures when applying the abstract texture and the other abstract textures to the object model.

14. The method of claim 11, further comprising:
    generating other abstract textures respectively for other facades of the plurality of facades; and
    performing at least one of:
      specifying a same window color, a same non-window color, or combination thereof for the abstract texture and the other abstract textures for all of the plurality of facades;
      specifying the same window color, the same non-window color, or a combination thereof for opposite facades of the plurality of facades; and
      specifying window colors within a defined range, and non-window colors within another defined range, or a combination thereof for non-opposite facades of the plurality of facades.

15. The method of claim 11, further comprising:
    generating other abstract textures respectively for other facades of the plurality of facades, wherein a height of an entrance level of the building depicted in the abstract texture and other abstract textures is the same.

16. An apparatus for generating abstract texture data comprising:
at least one processor; and
at least one memory including computer program code for one or more programs,
the at least one memory and the computer program code configured to, with the at least one processor, cause the apparatus to perform at least the following,
receive pixel-level labeling data for an image depicting at least a portion of a building facade, wherein the pixel-level labeling data labels each of a plurality of pixels of the image as either building-feature pixels or non-building-feature pixels;
process the pixel-level labeling data to determine building-feature size data, building-feature spacing data, building-feature color data, or a combination thereof;
generate a building-feature pattern based on the building-feature size data, the building-feature spacing data, the building-feature color data, or a combination thereof;
compute a confidence score for the building-feature pattern based on at least one observed value of at least one characteristic of the building-feature pattern or a deviation of the at least one observed value from at least one expected value; and
generate an abstract texture for an object model of the building facade represented in the image based on the building-feature pattern and the confidence score.

17. The apparatus of claim 16, wherein the apparatus is further caused to:
determine an obscured portion of the image; and
extrapolate the building-feature pattern to generate the abstract texture associated with the obscured portion of the image.

18. The apparatus of claim 16, wherein the apparatus is further caused to:
create an image mask based on the pixel-level labeling data to distinguish between the building-feature pixels and the non-building-feature pixels of the image;
identify a plurality of building-feature shapes in the image mask; and
compute a mode of one or more dimensions of the plurality of building-feature shapes, a mode of one or more spacings between the plurality of building-feature shapes, or a combination thereof,
wherein the building-feature size data is based on the mode of the one or more dimensions of the plurality of building feature shapes; and
wherein the building-feature spacing data is based on the mode of the one or more spacings between the plurality of building-feature shapes.

19. A non-transitory computer-readable storage medium for generating a cleaned object model to represent a building, carrying one or more sequences of one or more instructions which, when executed by one or more processors, cause an apparatus to perform:
receiving pixel-level labeling data for an image depicting at least a portion of an object surface, wherein the pixel-level labeling data labels each of a plurality of pixels of the image as either object-feature pixels or non-object-feature pixels;
processing the pixel-level labeling data to determine object-feature size data, object-feature spacing data, object-feature color data, or a combination thereof;
generating an object-feature pattern based on the object-feature size data, the object-feature spacing data, the object-feature color data, or a combination thereof;
computing a confidence score for the object-feature pattern based on at least one observed value of at least one characteristic of the object-feature pattern or a deviation of the at least one observed value from at least one expected value; and
generating an abstract texture for a model of the object based on the object-feature pattern and the confidence score.

20. The non-transitory computer-readable storage medium of claim 19, wherein the apparatus is further caused to perform:
determining an obscured portion of the object in the image; and
extrapolating the object-feature pattern to generate the abstract texture associated with the obscured portion of the object.

* * * * *